(12) United States Patent
Phillips et al.

(10) Patent No.: US 7,293,276 B2
(45) Date of Patent: Nov. 6, 2007

(54) INTERACTIVE TELEVISION PROGRAM GUIDE FOR RECORDING ENHANCED VIDEO CONTENT

(75) Inventors: Rick Phillips, Santa Monica, CA (US); William L Thomas, Bixby, OK (US)

(73) Assignee: United Video Properties, Inc., Los Angeles, CA (US)

( * ) Notice: Subject to any disclaimer, the term of this patent is extended or adjusted under 35 U.S.C. 154(b) by 446 days.

(21) Appl. No.: 10/306,174

(22) Filed: Nov. 25, 2002

(65) Prior Publication Data

US 2003/0126607 A1    Jul. 3, 2003

Related U.S. Application Data

(60) Provisional application No. 60/333,569, filed on Nov. 26, 2001.

(51) Int. Cl.
*H04N 5/445*    (2006.01)
*G06F 3/00*    (2006.01)
*G06F 13/00*    (2006.01)

(52) U.S. Cl. .................... 725/42; 725/41; 725/43; 725/60

(58) Field of Classification Search ............ 725/41–43, 725/60
See application file for complete search history.

(56) References Cited

U.S. PATENT DOCUMENTS

| | | | |
|---|---|---|---|
| 4,264,924 A | 4/1981 | Freeman | 725/138 |
| 4,264,925 A | 4/1981 | Freeman et al. | 725/138 |
| 4,573,072 A | 2/1986 | Freeman | 725/136 |
| 4,706,121 A | 11/1987 | Young | 348/27 |
| 4,908,707 A | 3/1990 | Kinghorn | 348/460 |
| 4,945,563 A | 7/1990 | Horton et al. | 380/203 |
| 4,977,455 A | 12/1990 | Young | 348/460 |
| 5,038,211 A | 8/1991 | Hallenbeck | 348/460 |
| 5,047,867 A | 9/1991 | Strubbe et al. | 386/83 |
| 5,068,733 A | 11/1991 | Bennett | 725/73 |
| 5,151,789 A | 9/1992 | Young | 725/133 |
| 5,187,589 A | 2/1993 | Kono et al. | 386/83 |
| 5,195,134 A | 3/1993 | Inoue | 380/242 |

(Continued)

FOREIGN PATENT DOCUMENTS

EP    0 682 452    11/1995

(Continued)

*Primary Examiner*—Hunter B. Lonsberry
(74) *Attorney, Agent, or Firm*—Brian E. Mack; Chia Jao La; Ropes & Gray LLP

(57) ABSTRACT

Interactive television systems and methods are provided for enhancing program guide content using recording and alert features for video related to promotions, advertisements, and other selectable displays presented in an interactive television application such as an interactive television program guide. An option to record video related to a selectable display may be presented to users. The option to record may be presented in an information display screen that is displayed in response to a user selecting a selectable display. The interactive television system may automatically record the related video in response to the user selecting the record option using a local or a network-based recording and storage device. Users may access a list of recordings that have been recorded. Other types of media may be integrated into the list, and listings may be selected and viewed by the user.

36 Claims, 32 Drawing Sheets

U.S. PATENT DOCUMENTS

| | | | |
|---|---|---|---|
| 5,210,611 A | 5/1993 | Yee et al. | 348/473 |
| 5,223,924 A | 6/1993 | Strubbe | 725/46 |
| RE34,340 E | 8/1993 | Freeman | 358/86 |
| 5,253,066 A | 10/1993 | Vogel | 725/28 |
| 5,285,284 A | 2/1994 | Takashima et al. | 348/731 |
| 5,296,931 A | 3/1994 | Na | 725/38 |
| 5,323,234 A | 6/1994 | Kawasaki | 725/141 |
| 5,410,344 A | 4/1995 | Graves et al. | 725/46 |
| 5,416,508 A | 5/1995 | Sakuma et al. | 725/54 |
| 5,479,266 A | 12/1995 | Young et al. | 386/83 |
| 5,479,268 A | 12/1995 | Young et al. | 386/83 |
| 5,485,219 A | 1/1996 | Woo | 348/460 |
| 5,532,754 A | 7/1996 | Young et al. | 725/47 |
| 5,534,911 A | 7/1996 | Levitan | 725/46 |
| 5,539,822 A | 7/1996 | Lett | 380/211 |
| 5,550,576 A | 8/1996 | Klosterman | 725/46 |
| 5,568,272 A | 10/1996 | Levine | 386/48 |
| 5,585,838 A | 12/1996 | Lawler et al. | 725/54 |
| 5,585,858 A | 12/1996 | Harper et al. | 348/485 |
| 5,589,892 A | 12/1996 | Knee et al. | 725/43 |
| 5,592,551 A | 1/1997 | Lett et al. | 382/261 |
| 5,619,274 A | 4/1997 | Roop et al. | 348/461 |
| 5,629,733 A | 5/1997 | Youman et al. | 725/53 |
| 5,631,995 A | 5/1997 | Weissensteiner et al. | 386/1 |
| 5,632,007 A | 5/1997 | Freeman | 706/59 |
| 5,657,072 A * | 8/1997 | Aristides et al. | 725/46 |
| 5,657,414 A | 8/1997 | Lett et al. | 386/35 |
| 5,684,525 A | 11/1997 | Klosterman | 725/48 |
| 5,694,381 A | 12/1997 | Sako | 369/47.12 |
| 5,699,107 A * | 12/1997 | Lawler et al. | 725/58 |
| 5,724,091 A | 3/1998 | Freeman et al. | 725/138 |
| 5,727,060 A | 3/1998 | Young | 348/734 |
| 5,758,257 A | 5/1998 | Herz et al. | 725/116 |
| 5,790,198 A | 8/1998 | Roop et al. | 725/48 |
| 5,801,787 A | 9/1998 | Schein et al. | 725/43 |
| 5,805,763 A | 9/1998 | Lawler et al. | 386/83 |
| 5,808,608 A | 9/1998 | Young et al. | 725/52 |
| 5,809,204 A | 9/1998 | Young et al. | 386/83 |
| 5,812,205 A | 9/1998 | Milnes et al. | 348/460 |
| 5,812,937 A | 9/1998 | Takahisa et al. | 455/66 |
| 5,828,945 A | 10/1998 | Klosterman | 455/42 |
| 5,850,218 A | 12/1998 | LaJoie et al. | 455/4.2 |
| 5,940,572 A | 8/1999 | Balaban et al. | 386/46 |
| 5,959,688 A * | 9/1999 | Schein et al. | 725/49 |
| 6,141,488 A | 10/2000 | Knudson et al. | 386/83 |
| 6,157,413 A | 12/2000 | Hanafee et al. | 348/563 |
| 6,177,931 B1 * | 1/2001 | Alexander et al. | 725/52 |
| 6,208,799 B1 | 3/2001 | Marsh et al. | 386/83 |
| 6,233,389 B1 | 5/2001 | Barton et al. | 386/46 |
| 6,275,648 B1 | 8/2001 | Knudson et al. | 386/83 |
| 6,327,418 B1 | 12/2001 | Barton et al. | 386/46 |
| 6,442,332 B1 | 8/2002 | Knudson et al. | 386/83 |
| 6,473,559 B1 | 10/2002 | Knudson et al. | 386/83 |
| 6,662,365 B1 * | 12/2003 | Sullivan et al. | 725/25 |
| 6,757,906 B1 * | 6/2004 | Look et al. | 725/45 |
| 2002/0144279 A1 | 10/2002 | Zhou | 725/95 |
| 2002/0174430 A1 | 11/2002 | Ellis et al. | 725/46 |

FOREIGN PATENT DOCUMENTS

| | | |
|---|---|---|
| EP | 0 753 964 | 1/1997 |
| EP | 0 836 320 | 4/1998 |
| EP | 0 854 645 | 7/1998 |
| GB | 2 229 595 | 9/1990 |
| WO | WO 93/23957 | 11/1993 |
| WO | WO 96/26605 | 8/1996 |
| WO | WO 96/36172 | 11/1996 |
| WO | WO 96/37075 | 11/1996 |
| WO | WO 97/13368 | 4/1997 |
| WO | WO 98/48566 | 10/1998 |
| WO | WO 99/52279 | 10/1999 |
| WO | WO 99/66725 | 12/1999 |
| WO | WO 00/04706 | 1/2000 |
| WO | WO 00/07368 | 2/2000 |
| WO | WO 00/08852 | 2/2000 |
| WO | WO 00/16548 | 3/2000 |
| WO | WO 00/58833 | 10/2000 |
| WO | WO 00/58967 | 10/2000 |
| WO | WO 00/59223 | 10/2000 |
| WO | WO 00/67475 | 11/2000 |
| WO | WO 01/22729 | 3/2001 |
| WO | WO 01/76239 | 10/2001 |

* cited by examiner

VIDEO OF SELECTED VOD PROGRAM

246

248

INTERACTIVE TELEVISION PROGRAM GUIDE FOR RECORDING ENHANCED VIDEO CONTENT

This application claims the benefit of U.S. provisional patent application No. 60/333,569, filed Nov. 26, 2001, which is hereby incorporated by reference herein in its entirety

BACKGROUND OF THE INVENTION

This invention relates to television systems, and, more particularly, to interactive television systems such as interactive television program guide systems with video recording capabilities.

Interactive television systems may be used to provide interactive television applications, such as interactive television program guides, which present screens of interactive television program listings to users. The screens presented in interactive television program guides may also include selectable displays, such as advertisements, which users may select to access additional information for the advertised product or service. The products and services advertised using the interactive television system may include for example, program guide services, pay-per-view and video-on-demand services, web browsing services, games, home shopping, or any other suitable product or service.

In typical interactive television systems, users may have access to set-top boxes or other user equipment in their home. Users may interact with this equipment using remote controls or other user interfaces. In a personal computing environment, users may access interactive television program guide web sites.

Interactive television program guides may be implemented on personal video recorder platforms. A typical personal video recorder has a hard disk drive for storing digital video recordings that may be played back on a user's television. Video recorder functionality may also be provided using equipment at a cable system headend. With this type of network-based video recorder, a user may direct equipment at the headend to perform video recording and playback functions.

Sometimes a user of an interactive television application, such as an interactive television program guide, may have only just enough time to briefly peruse a program guide advertisement. The user may not have time to view more extensive information (e.g., of the type that might be provided in an advertising video).

It would therefore be desirable to allow users of interactive television applications to set up recordings for videos related to advertisements so that the videos could later be provided to and viewed by the user at a more suitable time.

SUMMARY OF THE INVENTION

In accordance with the present invention, interactive television systems are provided that allow users to record videos related to promotional or informational items presented by an interactive television application. Interactive television functionality may be supported through the use of an interactive television application such as an interactive television program guide implemented on user equipment such as a cable set-top box, personal video recorder, personal computer, satellite integrated receiver decoder (IRD) box, interactive television, or other suitable device. The interactive television application may be used to provide video recorder functions, video-on-demand functions, and program guide services.

The interactive television application may generate screens of interactive television information. A typical screen generated by an interactive television program guide may include a list of scheduled television programs and selectable advertisements. If desired, other program guide content may be provided on such a screen in addition to program listings information. For example, an interactive television program guide may generate and display a screen on the user's equipment that includes television program reviews, news, weather information, etc. Typical interactive television program guide content such as program listings content may be provided in the form of text, graphics, any other suitable media format, or a combination thereof. Video information (e.g., video clips or picture-in-guide video) may also be displayed on a program guide screen by the interactive television program guide.

The program guide content (e.g., the program listings) may often be accompanied by selectable displays such as advertisements. Advertisements may be used to promote products (e.g., tangible goods), services, television programs, etc. A typical graphic advertisement for a television program may include a still image of the actors in the program, channel information, the time at which the program or series airs, or any other suitable information. A typical graphic advertisement for interactive magazine content may include a promotional phrase such as "See Hollywood Headlines" embedded in a colorful panel advertisement graphic. Advertisements may be presented in the form of panel ads (typically box-shaped ads placed to the left or right of program listings or other program guide content on the screen) or banner ads (rectangular ads often located at the top or bottom of the screen). These are merely illustrative examples of the content and format of advertisements that may be presented by the interactive television program guide. It will be understood that the interactive television program guide (or other interactive television application) may display any suitable type of interactive promotional information, selectable content item, or selectable advertisement if desired.

A user may select an item (such as an advertisement) that is displayed on a program guide screen by using a remote control (or other suitable user interface) to maneuver a highlight region on top of the desired item. The highlight may take the form of a colored frame around the item of interest, darkened or lightened background, a visually moving indicator, a pointer, or any other suitable visual indication that the item has been "highlighted." After the user has highlighted the advertisement or other item of interest on the program guide screen, the user may press a "select" or "enter" button on the remote control (or make this type of selection using another suitable user interface). This type of operation (typically two-steps —highlighting and pressing enter) may be referred to as "selecting."

After a user has selected the desired advertisement or other item on the program guide screen, the interactive television program guide may respond by displaying a screen containing additional or related information. For example, if a user selects an advertisement for an automobile, the interactive television program guide may display more detailed information about the automobile to the user (e.g., features, specifications, information on price and dealer locations, etc.). The user may scroll or page through one or more pages or sections of such additional information.

The screen of additional information that is displayed in response to the user's initial selection of the advertisement (or other item) may allow the user to set up a recording of a related video. The related video may, for example, be an infomercial-type video that is broadcast at an off-peak hour (e.g., late at night). If, for example, the user is initially presented with a program guide screen containing program guide information and a selectable advertisement for an automobile, the user may obtain additional information on the automobile by selecting the advertisement (e.g., using the remote control). In response, the interactive television program guide may display a screen of additional information on the automobile (e.g., specifications, price, etc.). The interactive television program guide may simultaneously display an on-screen "record" option on the same screen as the additional information. If the user selects this option (e.g., by highlighting it and pressing enter, etc.) the interactive television program guide will take appropriate actions to obtain a copy of a video on the automobile. The video may, for example, show interior and exterior views of the automobile, may contain a review of the automobile, may discuss pricing and leasing options, may discuss accessories that are available, etc. The video may, if desired, be accompanied by interactive overlays that allow the user to order the displayed or advertised item.

The video (e.g., the automobile video in this example) may be recorded and stored locally (e.g., on the user's personal video recorder, recordable DVD player, computer disk, or video cassette recorder) or may be recorded and stored on a network-based personal video recorder. Recordings may be real or virtual. Real recordings may be made by converting broadcast video signal into signals suitable for analog or digital storage. Virtual recordings may be made by placing a copy of the desired video onto the user's equipment or by updating the user's "personal area" on a network to reflect that the user now possesses a copy of the video. These are merely illustrative arrangements. Any suitable technique for providing a user with an opportunity to direct the program guide to make the recording may be used if desired. Moreover, any suitable approach may be used for recording or obtaining copies of a video for which the user indicates interest. An on-screen option is only one such illustrative example. Other possible techniques for requesting that a recording be made of the video include pressing a dedicated remote control button, issuing a suitable voice command, clicking on an option displayed on a user input device, etc.

Program guide functionality may be enhanced by providing program guide features and other functions related to setting up and viewing video recordings related to program guide content. Such features may be provided in any suitable interactive television application. For example, an alert display may provide a user with an option to access video that has been recorded (e.g., a recorded video related to a selected advertisement for an automobile). An alert may first appear when a user first interacts with the program guide after the related video has been recorded. The timing and configuration of the alerts may be implemented in a number of different ways. For example, reminders may be sent to users by e-mail, in the form of a dialogue prompt in the program guide, or by any method that sufficiently alerts users that related programming is available. Users may be permitted to configure their alerts when they select the option to record the related video or when an alert is displayed for the first time.

Other features provided by the interactive television application may include a record option that enables users to select to have the interactive television system automatically record video related to a selected advertisement, such as video information, video segments, or programming related to the content of a selected advertisement. Related video may be recorded using a video recorder (VCR), a personal video recorder (PVR), digital storage device, a remote server, or any available means for recording programming.

The record option may be implemented not only for selectable advertisements, but also for other onscreen program guide content generated on a guide screen, for example a program listing, a logo, a promotion or event, a channel listing, portal links, options for interactive services, weather forecasts, etc. In one technique, the selection of guide content presented on a screen leads to the presentation of another display graphic that includes a record option among other information and/or options for that particular guide content. The user may select the record option to have the program guide automatically record video that is related to that particular guide content. In circumstances where, for example, the particular guide content is for a program, the video for which the record option is provided may be video other than the program itself (e.g., a preview, a promotional clip, etc.). Guide content may also be considered to include advertising (e.g., advertisements not focusing on programming) or other promotional information.

Video may be recorded automatically by including a link to the related video in the data structure of the advertisement or other selectable display. This allows the guide to automatically record the program. If desired, the relevant video may be broadcast during times in which user activity is expected to be low (e.g., midnight). The time or channel at which the related video will be broadcast (and recorded) may be unknown or invisible to a user who selects the record option. Support video may also be recorded using local or remote personal video recording devices or network-based recording devices, which may be used in conjunction with an interactive television application, a personal video recorder application, a network-based video recorder application, any other suitable application or a combination thereof.

For clarity and brevity, features and functionality of the invention have sometimes been discussed in the context of program guides. Such systems and methods may be implemented for other interactive television applications or may be implemented to support both a program guide and another interactive television application. Also for clarity and brevity, features and functionality of the invention have sometimes been discussed in the context of providing selectable displays in the form of advertisements (e.g., advertisements for products, television programs and events, etc.). However, as discussed above, other selectable displays for a variety of guide content may be used in conjunction with the system and methods of the present invention if desired.

BRIEF DESCRIPTION OF THE DRAWINGS

The above and other objects and advantages of the invention will be more apparent upon consideration of the following detailed description, taken in conjunction with the accompanying drawings, in which like reference numerals refer to like parts throughout, and in which:

FIG. 31 is a flow chart of illustrative steps involved in using an interactive television system to allow a user to select an advertisement and record video related to the selected advertisement in accordance with the present invention.

DETAILED DESCRIPTION

Figure 1:
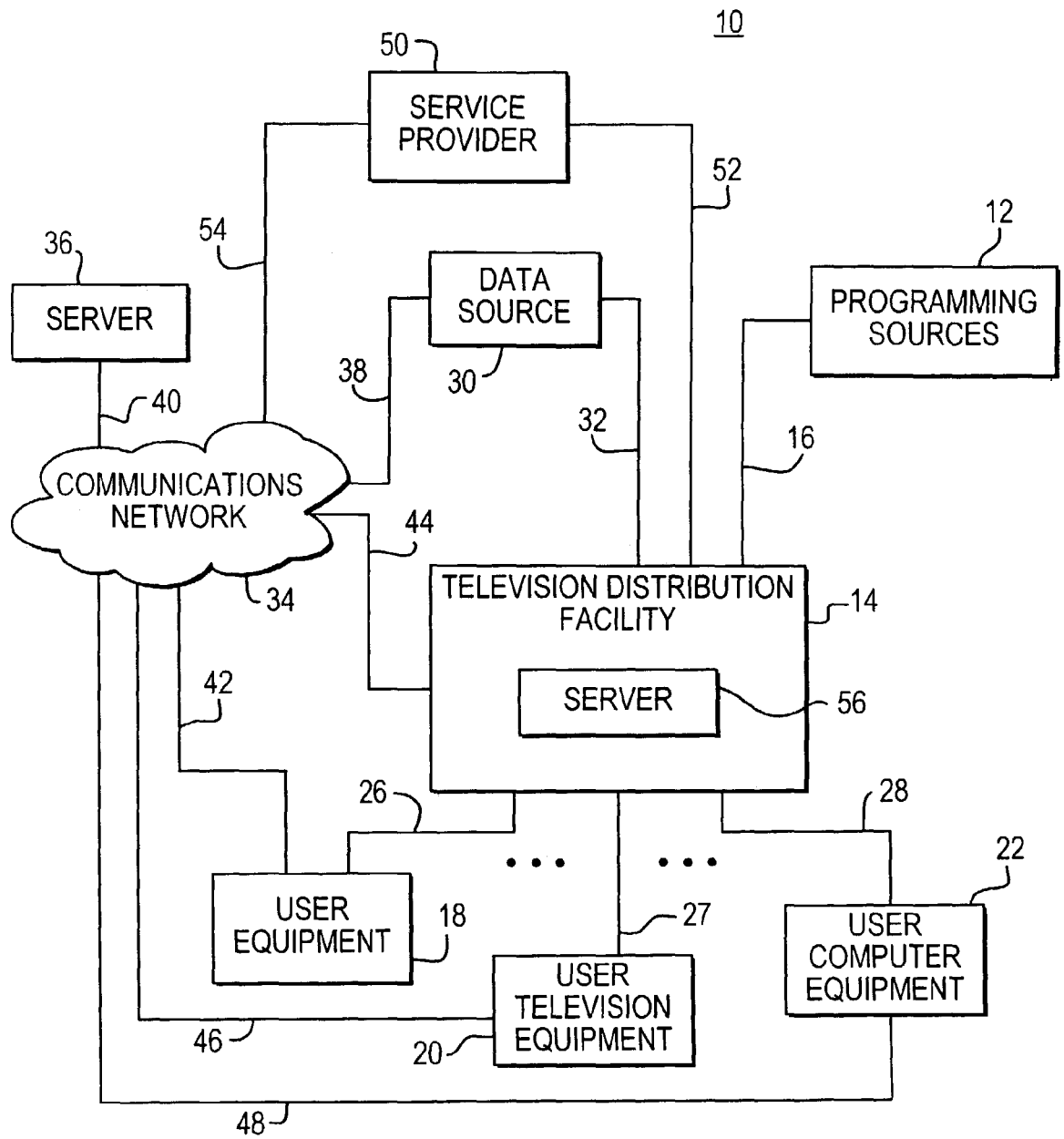
FIG. 1 is a diagram of an illustrative interactive television system in accordance with the present invention.

An illustrative interactive television system 10 in accordance with the present invention is shown in FIG. 1. Content such as television programming and digital music may be provided from programming sources 12 to television distribution facilities such as television distribution facility 14 using communications path 16. Programming sources 12 may be any suitable sources of television and music programming, such as television and music production studios, etc.

Television distribution facility 14 may be a cable system headend, a satellite television distribution facility, a television broadcast facility, or any other suitable facility for distributing television and music programming to users. There are typically numerous television distribution facilities 14 in system 10, but only one is shown in FIG. 1 to avoid overcomplicating the drawings.

Communications path 16 may be a satellite path, a fiber-optic path, a cable path, or any other suitable wired or wireless communications paths or a combination of such paths.

Television distribution facility 14 may be connected to various user equipment devices 18. Such user equipment 18 may, for example, be located in the homes of users. User equipment 18 may include user television equipment 20 or user computer equipment 22.

The user equipment may receive television and music programming and other information from television distribution facility 14 over communications paths such as communications paths 26, 27, and 28. The user equipment may also transmit signals to television distribution facility 14 over paths 26, 27, and 28. Paths 26, 27, and 28 may be cables or other wired connections, free-space connections (e.g., for broadcast or other wireless signals), satellite links, etc.

Data source 30 may include a program listings database that is used to provide the user with television program schedule information such as scheduled broadcast times, titles, channels, ratings information (e.g., parental ratings and critic's ratings), detailed title descriptions, genre or category information (e.g., sports, news, movies, etc.), information on actors and actresses, running times, etc. Data source 30 may also be used to provide advertisements (e.g., program guide advertisements and advertisements for other interactive television applications), real-time data such as sports scores, stock quotes, news, weather, etc. Although data source 30 is drawn as an individual box in FIG. 1, data source 30 and the other system components of FIG. 1 may be provided using equipment at one or more locations. Systems components are drawn as single boxes in FIG. 1 to avoid over-complicating the drawings.

Data source 30 may provide program schedule information and other data to television distribution facility 14 over communications path 32 for distribution to the associated user equipment over paths 26, 27, and 28. Communications path 32 may be any suitable communications path such as a satellite communications path or other wireless path, a fiber-optic or other wired communications path, a path that supports Internet communications, a combination of such paths, etc. Data source 30 may provide program schedule information and other data to the user at user equipment 18 over path 38, communications network 34, and path 42. Path 42 may be a wired path such as a telephone line, a cable path, a fiber-optic path, a satellite path, a wireless path, a combination of such paths, or any other suitable path.

User equipment devices such as user television equipment and personal computers may use the program schedule information to display program listings and information on digital music for the user. An interactive television program guide application or other suitable application may be used to display such information on the user's display.

An on-line program guide and other interactive television services may be provided using a server connected to communications network 34 such as server 36. Server 36 may receive program schedule information and other data from data source 30 via communications path 38, communications network 34, and communications path 40. Paths 38 and 40 may be satellite paths, fiber-optic paths, wired paths, etc. Communications network 34 may be any suitable communications network, such as the Internet, the public switched telephone network, a packet-based network, etc.

User equipment 18 may access on-line program guide information and other information from server 36 via communications path 42. User equipment 18 may also access the on-line program guide and other services on server 36 via communications path 26, television distribution facility 14, and communications path 44. For example, a cable modem or other suitable equipment may be used by user equipment 18 to communicate with television distribution facility 14. Television distribution facility 14 may communicate with communications network 34 over any suitable path 44, such as a wired path, a cable path, fiber-optic path, satellite path, a combination of such paths, etc.

User equipment such as user television equipment 20 and user computer equipment 22 may access the on-line program guide and server 36 using similar arrangements. User television equipment 20 may access the on-line program guide and server 36 using communications path 46 or using path 27, television distribution facility 14, and path 44. User computer equipment 22 may access the on-line program guide and server 36 using communications path 48 or using path 28, television distribution facility 14, and path 44. Paths 46 and 48 may be any suitable paths, such as wired paths, cable paths, fiber-optic paths, wireless paths, satellite paths, a combination of such paths, etc.

Program guide application functions and the functions of other interactive television applications may be supported using server 36 and other servers connected to communications network 34 such as server 56. Interactive television applications may also be supported by servers or other suitable equipment at one or more service providers such as service provider 50. For example, a home shopping service may be supported by a service provider such as service provider 50 that has sales representatives, order fulfillment facilities, account maintenance facilities, and other equipment for supporting interactive home shopping features. A home shopping application that is implemented using the user equipment may be used to access the service provider to provide these features to the user. The user equipment may access service provider 50 via television distribution facility 14 and communications path 52 or via communications network 34 and communications path 54. Communications paths such as paths 52 and 54 may be any suitable paths, such as wired paths, cable paths, fiber-optic paths, satellite paths, a combination of such paths, etc.

Another example of an interactive television application is a home banking application. A home banking service may be supported using personnel at facilities such as service provider 50. An interactive home banking application that is implemented using the user equipment may access the home banking service via television distribution facility 14 and communications path 52 or via communications network 34 and communications path 54.

If desired, an interactive television application such as a network-based video recorder or a video-on-demand application may be supported using server 56, server 36, or equipment at service provider 50. Video-on-demand content and video recorded using a network-based video recorder arrangement may be stored on server 56 or server 36 or at service provider 50 and may be provided to the user equipment when requested by users. An interactive television application may be used to support the functions of a personal video recorder (sometimes called a digital video recorder) that is implemented using user equipment 18. Illustrative equipment that may be used to support personal video recorder functions include specialized personal video recorder devices, integrated receiver decoders (IRDs), set-top boxes with integrated or external hard drives, or personal computers with video recording capabilities.

If desired, applications such as the interactive television program guide application, a home shopping application, a home banking application, a video-on-demand application, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping, network-based video recorder functions, personal video recorder functions, navigational functions, program guide functions, communications functions, and other suitable functions may be provided using one application or any other suitable number of applications.

Moreover, the interactive television program guide application, the home banking application, the home shopping application, the network-based video recorder and personal video recorder applications, the video-on-demand application, the gaming applications, communications applications, and navigational applications, are only a few illustrative examples of the types of interactive television applications that may be supported by system 10. Other suitable applications that may be supported include, news services, web browsing and other Internet services, and interactive wagering services (e.g., for wagering on horse races and the like).

The interactive television application or applications that are used in interactive television system 10 may be implemented locally on the user equipment. The applications may also be implemented in a distributed fashion (e.g., using a client-server architecture in which the user equipment serves at least partly and for at least-some of the time, as the client and a server such as server 56 at television distribution facility 14, server 36, or other suitable equipment acts as the server. Other distributed architectures may also be used if desired. Moreover, some or all of the interactive television system features of system 10 may be provided using operating system software or middleware software. Such operating system software and middleware may be used instead of or in combination with application-level software. Regardless of the particular arrangement used to implement interactive television features related to program guides, home shopping, home banking, video-on-demand, Internet, communications, etc., the software that supports these features may be referred to as an application or applications.

Figure 2:
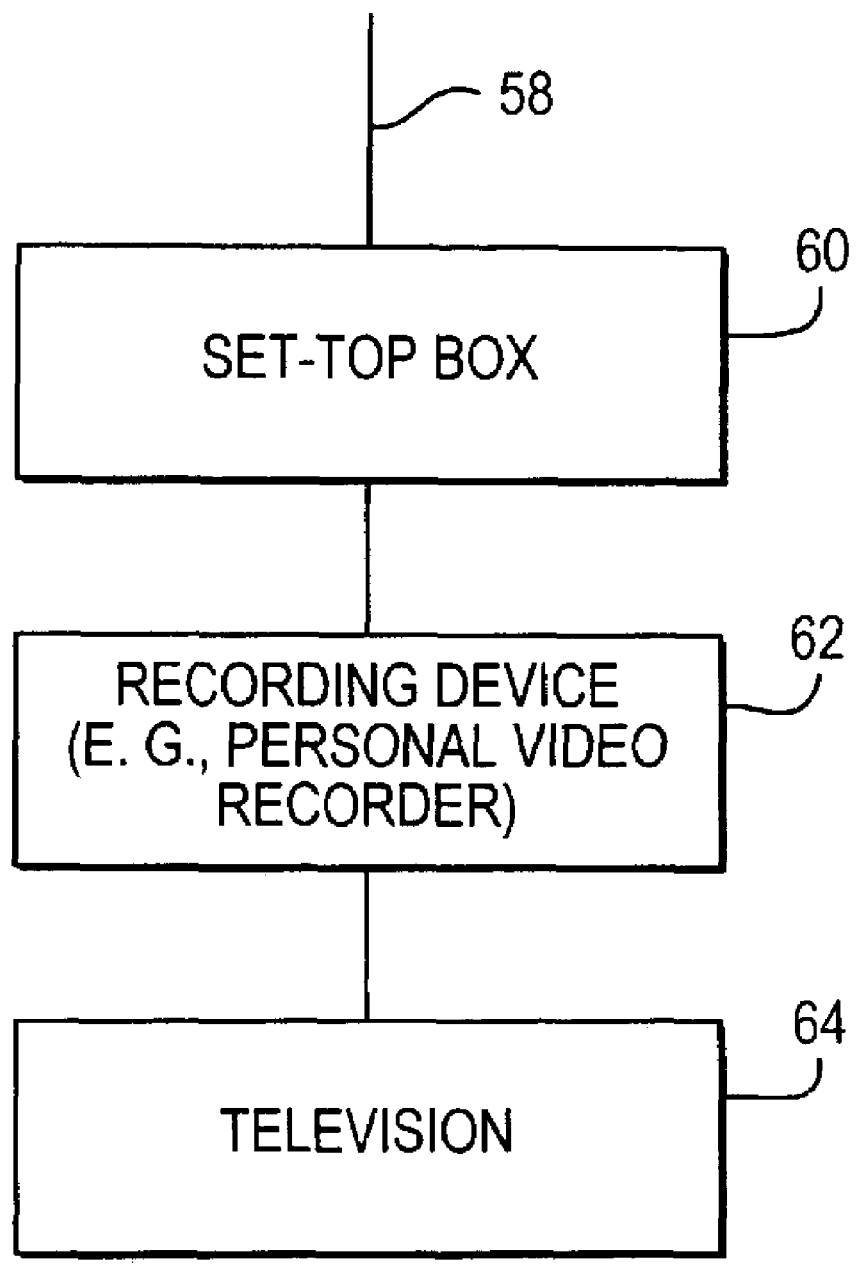
FIG. 2 is a diagram of illustrative user television equipment in accordance with the present invention.

Illustrative user television equipment 20 that is based on a set-top box arrangement is shown in FIG. 2. Input/output 58 may be connected to communications paths such as paths 27 and 46. Input/output functions may be provided by one or more wires or communications paths, but are shown as a single path in FIG. 2 to avoid overcomplicating the drawing. Television programming and other information may be received using input/output 58. Commands and requests and other information from the user may also be transmitted over input/output 58.

Set-top box 60 may be any suitable analog or digital set-top box (e.g., a cable set-top box). Set-top box 60 may contain an analog tuner for tuning to a desired analog television channel. Set-top box 60 may also contain digital decoding circuitry for receiving digital television and music channels. Both analog and digital channels may be handled together if desired. Multiple tuners may be provided (e.g., to handle simultaneous watch and record functions). Box 60 may be an integrated receiver decoder (IRD) that handles satellite television. If desired, box 60 may have circuitry for handling cable, over-the-air broadcast, and satellite content. Box 60 may include a storage device (e.g., a digital storage device such as a hard disk drive) for providing recording capabilities. Box 60 may also be connected to a recording device 62 such as a video cassette recorder, personal video recorder, or other device or devices with storage capabilities.

Set-top box 60 contains a processor (e.g., a microcontroller or microprocessor or the like) that is used to execute software applications. Set-top box 60 may contain memory such as random-access memory for use when executing applications. Nonvolatile memory may also be used (e.g., to launch a boot-up routine and other instructions). Hard disk storage in box 60 or in recording device 62 may be used to back up data and to otherwise support larger databases and storage requirements than may be supported using random-access memory approaches.

Set-top box 60 may have infrared (IR) or other communications circuitry for communicating with a remote control or wireless keyboard. Set-top box 60 may also have dedicated buttons and a front-panel display. The front-panel display may, for example, be used to display the current channel to which the set-top box is tuned.

Set-top box 60 may also have communications circuitry such as a cable modem, an integrated services digital network (ISDN) modem, a digital subscriber line (DSL) modem, a telephone modem, wireless modem, etc. for communications with other equipment. Such communications may involve the Internet or any other suitable communications networks or paths. If desired, the components of set-top box 60 may be integrated into other user equipment (e.g., a television or videocassette recorder).

Recording device 62 may be used to record videos provided by set-top box 60. For example, if set-top box 60 is tuned to a given television channel, the video signal for that television channel may be passed to recording device 62 for recording on a videocassette, compact disc, digital video disk, or internal hard drive or other storage device. Recording device 62 may have communications circuitry such as a cable modem, an ISDN modem, a DSL modem, a telephone modem, etc. for communications with other equipment. Such communications may involve the Internet or any other suitable communications networks or paths. The components of recording device 62 may be integrated into other user equipment (e.g., a television, stereo equipment, etc.).

Recording device 62 may be controlled using a remote control or other suitable user interface. If desired, video recorder functions such as start, stop, record, etc. and other functions for device 62 may be controlled by set-top box 60. For example, set-top box 60 may control recording device 62 using infrared commands directed toward the remote control inputs of recording device 62 or set-top box 60 may control recording device 62 using other wired or wireless communications paths between box 60 and device 62.

The output of recording device 62 may be provided to television 64 for display to the user. If desired, multiple recording devices 62 or no recording device 62 may be used. If recording device 62 is not present or is not being actively used, the video signals from set-top box 60 may be provided directly to television 64. Any suitable television or monitor may be used to display the video. In the equipment of FIG. 2 and the other equipment of system 10, the audio associated with various video items is typically distributed with those video items and is generally played back to the user as the videos are played.

Figure 3:
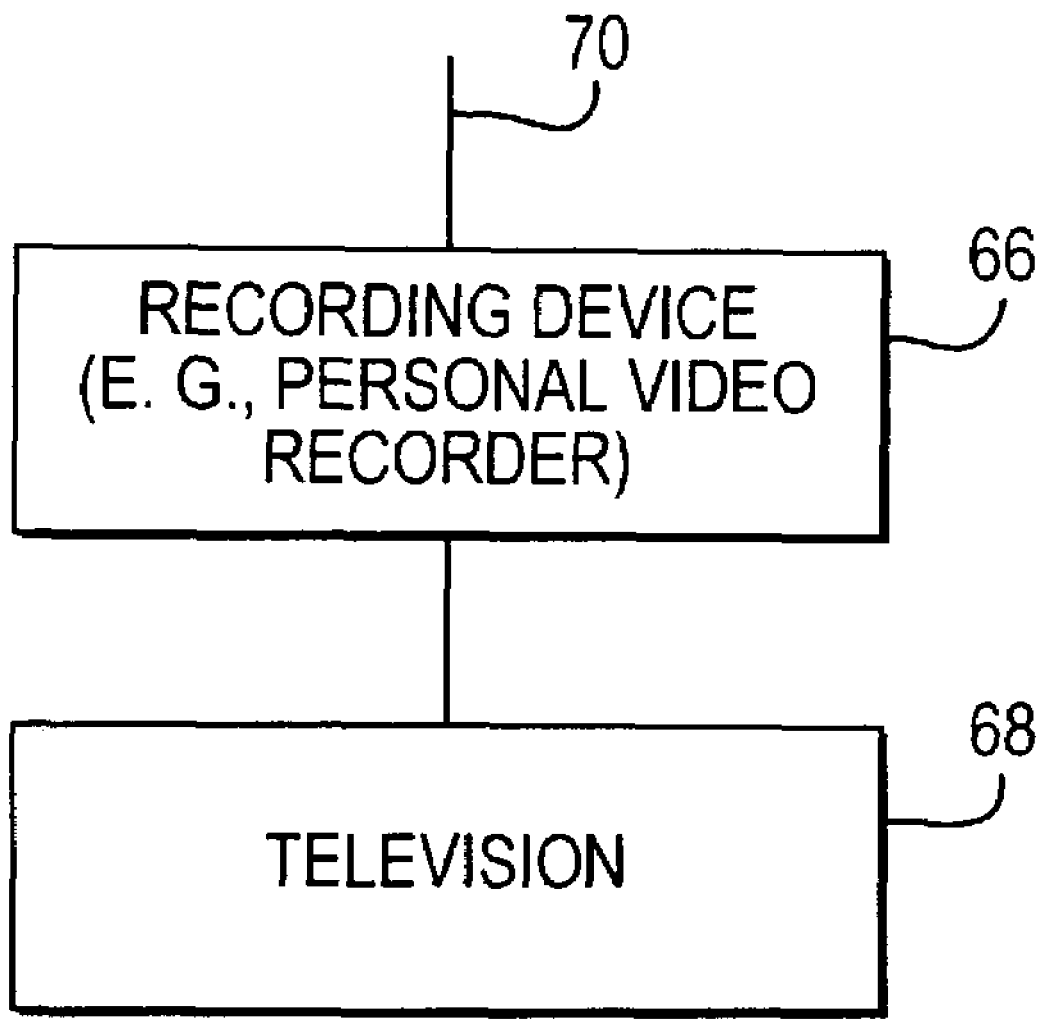
FIG. 3 is a diagram of additional illustrative user television equipment in accordance with the present invention.

Another illustrative arrangement for user television equipment 20 is shown in FIG. 3. In the example of FIG. 3, user television equipment 20 includes a recording device 66 such as a digital video recorder (e.g., a personal video recorder (PVR)) that uses a hard disk or other storage for recording video or may be a digital video disc recorder, compact disc recorder, videocassette recorder, or other suitable recording device. Equipment 20 of FIG. 3 may also include a television 68. Input/output 70 may be connected to communications paths such as paths 27 and 46. Television programming and other information may be received using input/output 70. Commands and requests and other information from the user may be transmitted over input/output 70.

Recording device 66 may contain at least one analog tuner for tuning to a desired analog television channel (e.g., multiple tuners may be provided). Recording device 66 may also contain digital decoding circuitry for receiving digital television and music channels. If desired, recording device 66 may contain circuitry for handling both analog and digital channels. Recording device 66 also contains a processor (e.g., a microcontroller or microprocessor or the like) that is used to execute software applications. Recording device 66 may contain memory such as random-access memory for use when executing applications. Nonvolatile memory may also be used to store a boot-up routine or other instructions. The hard disk and other storage in recording device 66 may be used to support databases (e.g., program guide databases or interactive television application databases). The hard disk or other storage in recording device 66 may also be used to record video such as television programs or video-on-demand content or other content provided to recording device 66 over input/output 70.

Recording device 66 may have IR communications circuitry or other suitable communications circuitry for communicating with a remote control. Recording device 66 may also have dedicated buttons and a front-panel display. The front-panel display may, for example, be used to display the current channel to which the recording device is tuned.

Recording device 66 may also have communications circuitry such as a cable modem, an ISDN modem, a DSL modem, a telephone modem, a wireless modem, etc. for communications with other equipment. Such communications may involve the Internet or other suitable communications networks or paths.

If desired, recording device 66 may include a satellite receiver or other equipment that has wireless communications circuitry for receiving satellite signals.

Recording device 66 of FIG. 3 or recording device 62 of FIG. 2 may record new video while previously recorded video is being played back on television 68 or 64. This allows users to press a pause button during normal television viewing. When the pause button is pressed, the current television program is stored on the hard disk of digital video recorder 66. When the user presses play, the recorded video may be played back. This arrangement allows the user to seamlessly pause and resume television viewing. Recording device 66 and 62 may also be used to allow a user to watch a previously-recorded program while simultaneously recording a new program.

The set-top box arrangement of FIG. 2 and the digital video recorder set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 60, digital video recorder 66, a WebTV box, or PC/TV or the like may be integrated into a television or personal computer or other suitable device.

Figure 4:
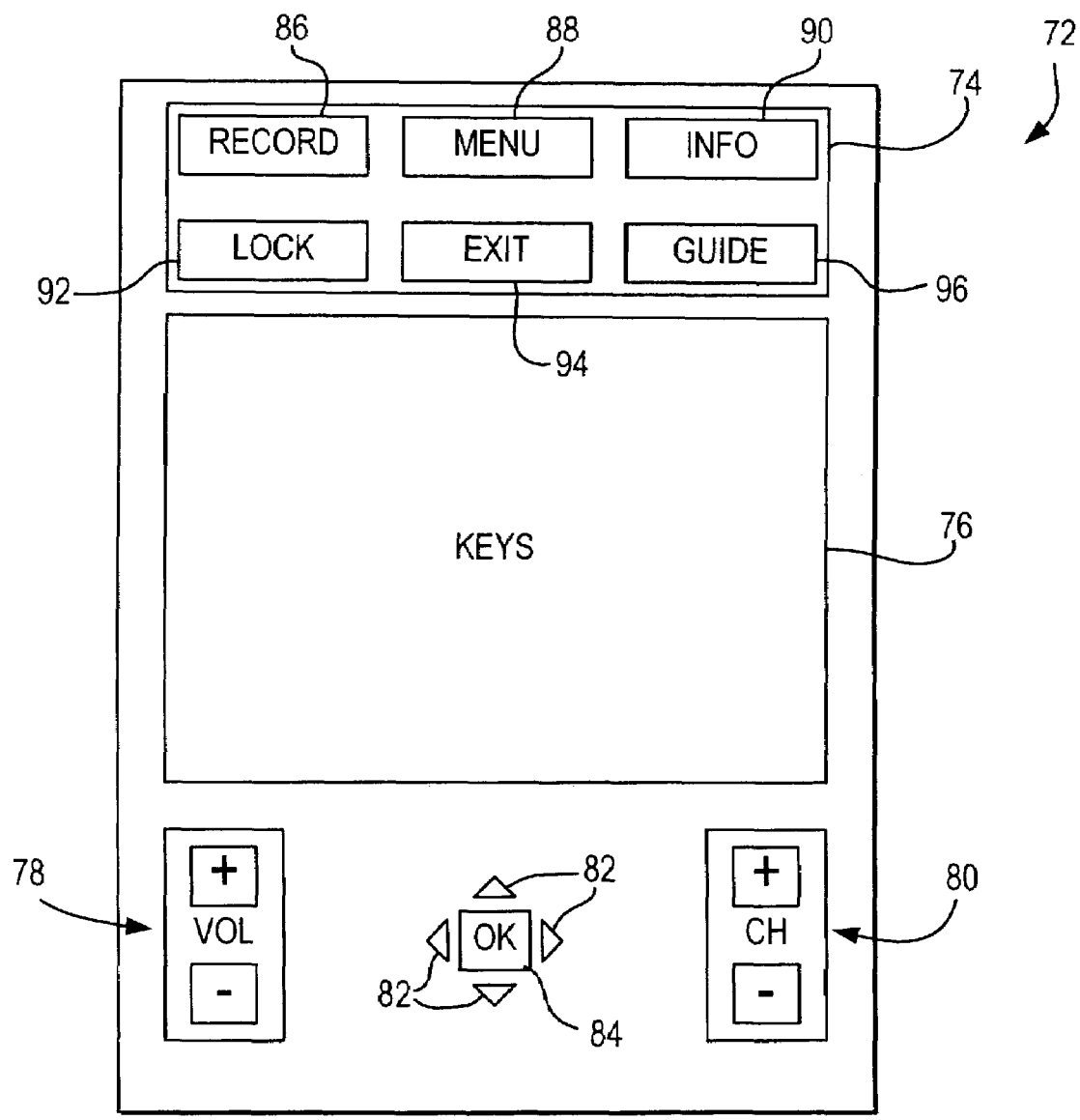
FIG. 4 is a diagram of an illustrative remote control in accordance with the present invention.

An illustrative remote control 72 for operating user television equipment 20 (or suitable user computer equipment 22) is shown in FIG. 4. Remote control 72 may have function keys 74 and other keys 76 such as keypad keys, power on/off keys, pause, stop, fast-forward and reverse keys, etc. Volume up and down keys 78 may be used for adjusting the volume of the audio portion of a video. Channel up and down keys 80 may be used to change television channels and to access content on virtual channels. Cursor keys 82 may be used to navigate onscreen menus. For example, cursor keys 82 may be used to position an on-screen cursor, indicator, or highlight (sometimes all generically referred to herein as a highlight or highlight region) to indicate interest in a particular option or other item on a screen displayed by the interactive television application.

An OK key 84 (sometimes called a select or enter key) may be used to select on-screen options that the user has highlighted.

Keys 74 may include a record key 86 for initiating recordings. Menu button 88 may be used to direct the interactive television application to display a menu on the user's display screen (e.g., on television 64 or 68 or on a suitable monitor or computer display). Info button 90 may be used to direct the interactive television application to display an information display screen. If the user has highlighted a particular program listing, for example, pressing the info button 90 may direct the interactive television application to provide additional program schedule information related to that program listing (e.g., a program summary, actor information, etc.).

Lock button 92 may be used to modify access privileges. For example, a parent may use lock button 92 or on-screen options to establish parental control settings for the interactive television application. The parental control settings may be time-based settings (e.g., to prevent a child from watching television during a particular time block such as from 3:00 PM to 5:00 PM). The parental control settings may also be used to block programming based on rating, channel, program title, etc. A locked or blocked program is typically not viewable until the interactive television application is provided with a suitable personal identification number (PIN). Once this PIN has been entered, the interactive television program will unlock the user's equipment and allow the locked content to be accessed.

Exit button 94 may be used to exit the interactive television application or to exit a portion of the interactive television application. Guide button 96 may be used to invoke the interactive television program guide.

The keys shown in FIG. 4 are merely illustrative. Other keys or buttons may be provided if desired. For example, a music button may be used to access music with the interactive television application. An edit button may be used to edit stored content (e.g., to remove commercials, remove portions of a video, etc.). Alphanumeric buttons may be used to enter alphanumeric characters. A last or back button may be used to browse backward in the interactive television application (e.g., to return to a previous channel or display screen). Video recorder function buttons such as a play button, pause button, stop button, rewind button, fast-forward button, and record button, may be used to control video recorder functions (local or network-based) in system 10. A help key may be used to invoke help functions such as context-sensitive on-screen help, etc.

Figure 5:
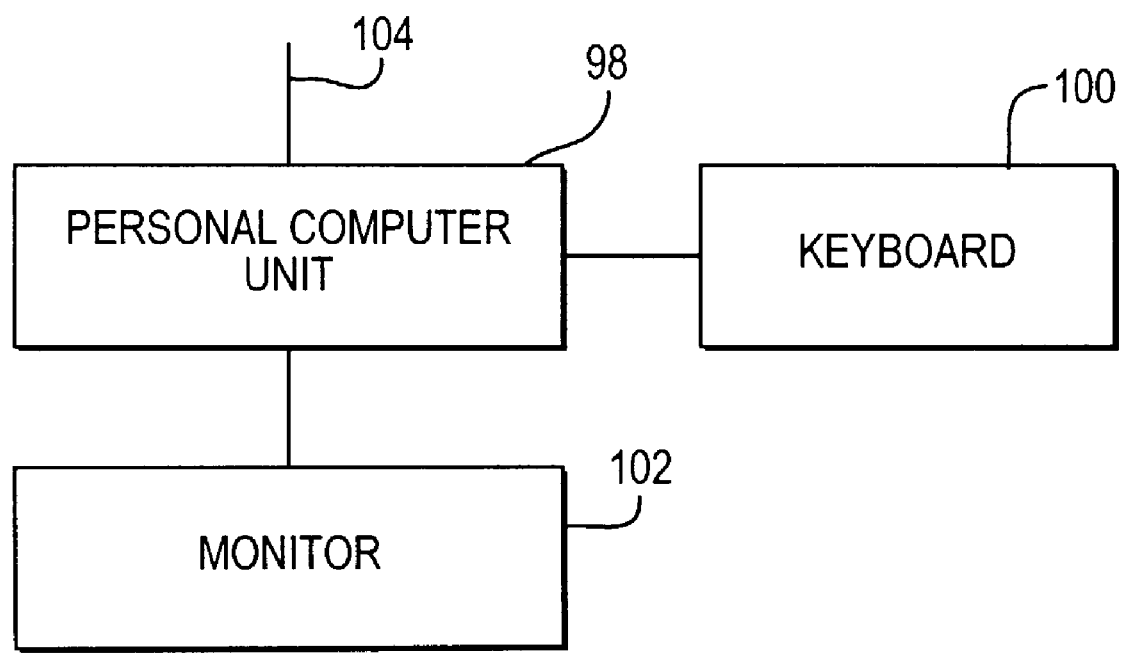
FIG. 5 is a diagram of illustrative user computer equipment in accordance with the present invention.

Illustrative user computer equipment 22 is shown in FIG. 5. In the arrangement of FIG. 5, personal computer 98 may be controlled by the user using keyboard 100 or other suitable user input device, such as a trackball, mouse, touch pad, touch screen, voice recognition system, a remote control such as remote control 72 of FIG. 4, etc. Video content such as television programming and interactive television application display screens may be displayed on monitor 102. Television programming, video-on-demand content, video recordings played back from a network-based video recorder, and other information may be received from paths 28 and 48 (FIG. 1) using input/output 104. The user may also send commands and other information used during interactions with the interactive television application and system 10 over input/output line 104.

Personal computer unit 98 may contain a television or video card such as television tuner card for decoding analog and digital television channels and for handling streaming video content. Multiple video cards (e.g., tuner cards) may be provided if desired. An illustrative television tuner card that may be used may contain an analog television tuner for tuning to a given analog channel and digital decoding circuitry for filtering out a desired digital television or music channel from a packetized digital data stream. Any suitable card or components in computer unit 98 may be used to handle video and other content delivered via input/output line 104 if desired.

Personal computer unit 98 may contain one or more processors (e.g., microprocessors) that are used to run the interactive television application or a portion of the interactive television application.

Storage in personal computer unit 98 such as a hard drive, DVD drive, CD drive, or other suitable storage device or devices may be used to store video and other content. For example, the interactive television application and personal computer unit 98 may use this storage to provide the functions of a personal video recorder.

User equipment 18 such as user television equipment 20 and user computer equipment 22 may be used with network equipment such as server 56, server 36, and equipment at service providers such as service provider 50 of FIG. 1 to provide network-based video recording functions. Video recording functions may be provided by storing copies of television programs and other video content on a remote server (e.g., server 56 or server 36 of FIG. 1) or other network-based equipment such as equipment at a service provider such as service provider 50.

Video recordings may be made in response to user commands that are entered at user equipment 18. In a personal video recorder arrangement, the interactive television application may be used to record video locally on the user equipment in response to the user commands. In a network-based video recorder arrangement, the interactive television application may be used to record video or to make virtual recordings on network equipment such as server 36, 56, or equipment at service provider 50 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, the system 10 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area.

The user television equipment and user computer equipment arrangements described above are merely illustrative. A more generalized embodiment of illustrative user equipment is shown in FIG. 6.

Figure 6:
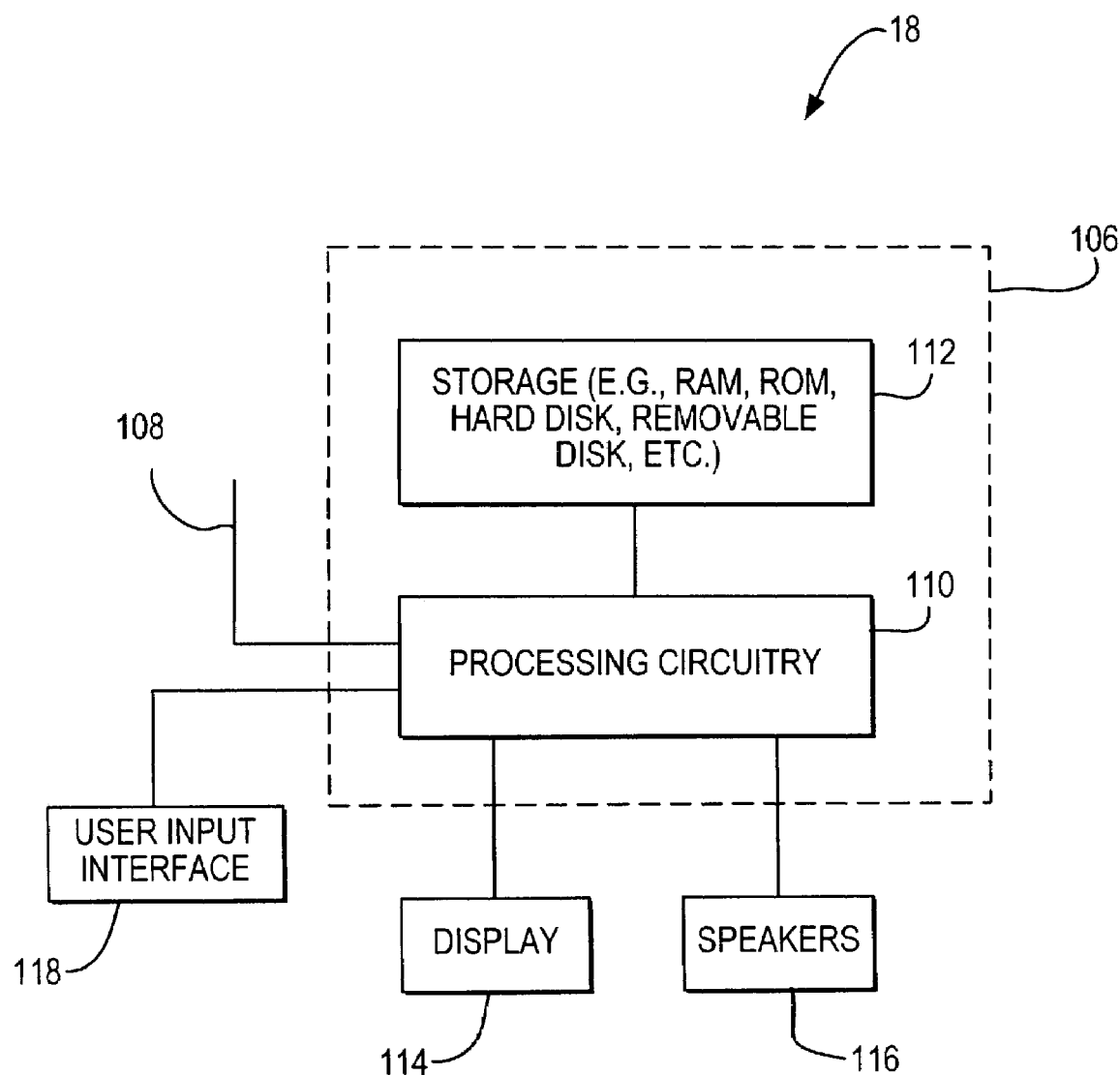
FIG. 6 is a generalized diagram of illustrative user equipment in accordance with the present invention.

As shown in FIG. 6, control circuitry 106 is connected to input/output 108. Input/output 108 may be connected to one or more communications paths such as paths 26, 27, 28, 42, 46, and 48 of FIG. 1. Television and music programming may be received via input/output 108 (e.g., from programming sources 12, servers or other equipment such as server 36, service providers such as service provider 50, and television distribution facility 14). Program schedule information for an interactive television program guide may be received from data source 30 via input/output 108. Input/output 108 may also be used to receive information from data source 30 for other interactive television applications. The user may use control circuitry 106 to send commands, requests, and other suitable information using input/output 108.

Control circuitry 106 may be based on any suitable processing circuitry 110 such as processing circuitry based on one or more microprocessors, microcontrollers, digital signal processors, programmable logic devices, etc. Memory (e.g., random-access memory and read-only memory), hard drives, DVD drives, CD drives, or any other suitable memory or storage devices may be provided as storage 112 that is part of control circuitry 106. Tuning circuitry such as one or more analog tuners, one or more MPEG-2 decoders or other digital video circuitry, or any other suitable tuning or video circuits or combinations of such circuits may also be included as part of circuitry 106. Encoding circuitry (e.g., for converting over-the-air or cable analog signals to MPEG signals for storage) may also be provided. The tuning and encoding circuitry may be used by the user equipment to receive and display or play or record a particular television or music channel or other desired audio and video content (e.g., video-on-demand content or requested network-based or local video recorder playback). Television programming and other video and on-screen options and information may be displayed on display 114. Display 114 may be a monitor, a television, or any other suitable equipment for displaying visual images. Speakers 116 may be provided as part of a television or may be stand-alone units. Digital music and the audio component of videos displayed on display 114 may be played through speakers 116.

A user may control the control circuitry 106 using user input interface 118. The user input interface 118 may be any suitable user interface, such as a mouse, trackball, keypad, keyboard, touch screen, touch pad, voice recognition interface, remote control, etc.

Figure 7:
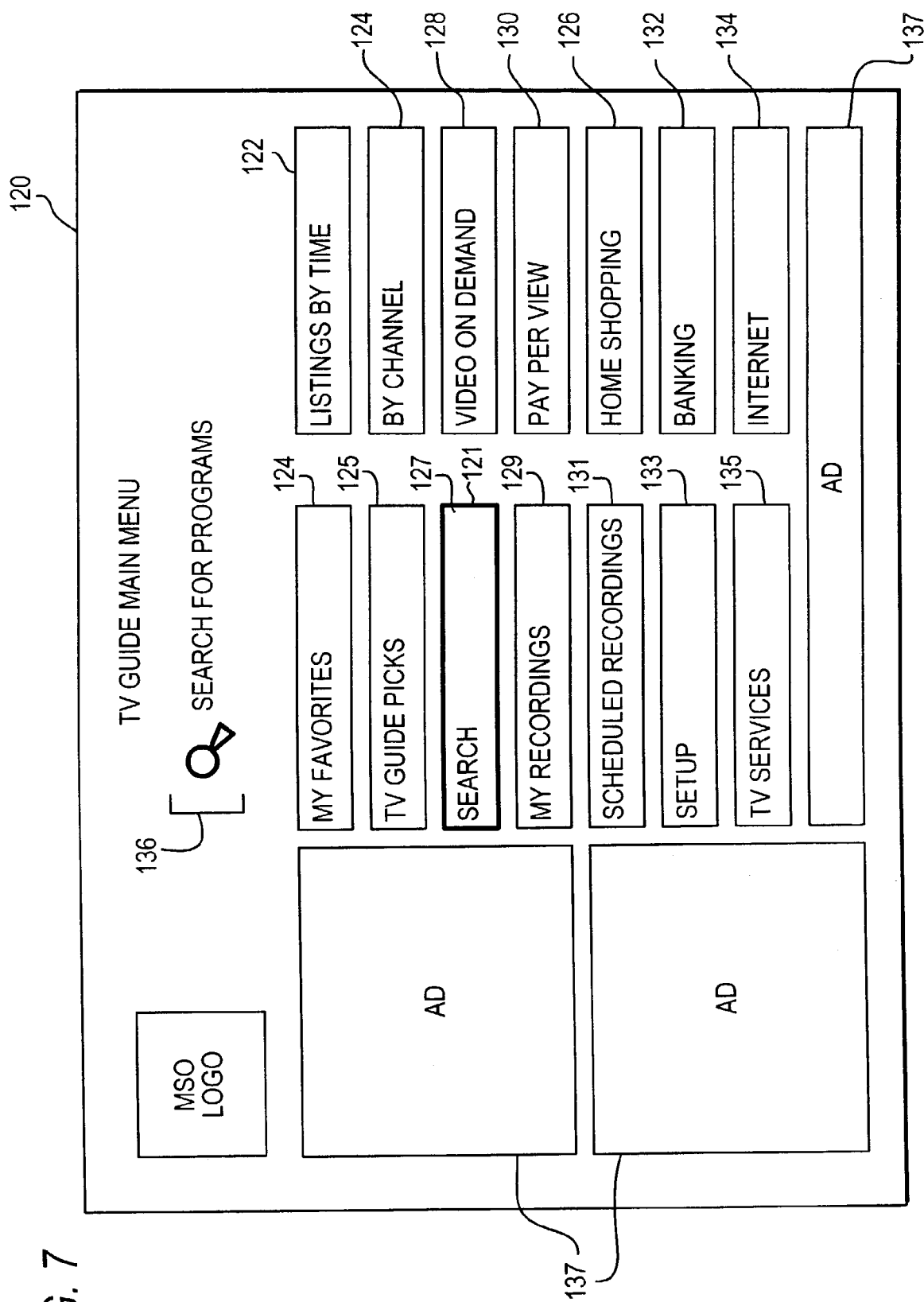
FIG. 7 shows an illustrative menu screen in accordance with the present invention.

An illustrative menu 120 that may be displayed on the user's display screen is shown in FIG. 7. As shown in FIG. 7, menu 120 may provide the user with an number of selectable options. The options shown in FIG. 7 are merely illustrative. Any suitable options may be provided if desired.

A user of user equipment 18 (e.g., a user of user television equipment 20 or a user of user computer equipment 22, or a user of any other suitable user equipment device) may invoke an interactive television menu such as menu screen 120 by pressing menu button 88 (FIG. 4). Remote control 72 (FIG. 4) or other user interface 118 (FIG. 6) may be used to position highlight region 121 on top of selectable options such as options 122-135. If the user selects option 122 or 123, a screen of program listings may be displayed. Option 124 may be used to display program listings for channels designated by the user as "favorites." Option 125 may be used to provide program listings selected for promotion by a service provider (e.g., a program guide service provider, a cable operator, etc.). Option 126 may be used to invoke a home shopping service. Options 127 may be used to search program listings by title, time, category, or any other criteria. Option 128 may be selected to display options related to video-on-demand services. Option 129 may be selected to display an interactive list of previously recorded recordings and option 131 may be selected to display an interactive list of programs scheduled for recording. Option 130 may be selected to display pay-per-view program listings and pay-per-view services options. If the user selects option 132, the user may be presented with an opportunity to access home banking functions. Option 133 may be selected to change system setup options and option 134 may be selected to launch a web browser or other application for accessing the Internet. Option 135 may be selected to access other interactive television services. When the user selects an option with highlight region 121 from menu screen 120, the user's selection may be described in information display region 136.

If desired, program guide screens such as menu screen 120 and other interactive television application screens may include selectable advertisements 137. Any suitable advertisements may be provided, including panel advertisements, banner advertisements, advertisements provided between program listings, advertisements provided on certain program listings or other portions of the screen, or any other suitable advertisements. A user may use cursor keys 82 of remote control 72 (FIG. 4) to position a highlight region on an advertisement of interest and may select the highlighted advertisement using OK key 84. Users of other user interfaces may make appropriate selections using the buttons or controls available through those interfaces (e.g., using voice commands if the user interface involves a voice recognition arrangement, etc.).

Figure 8:
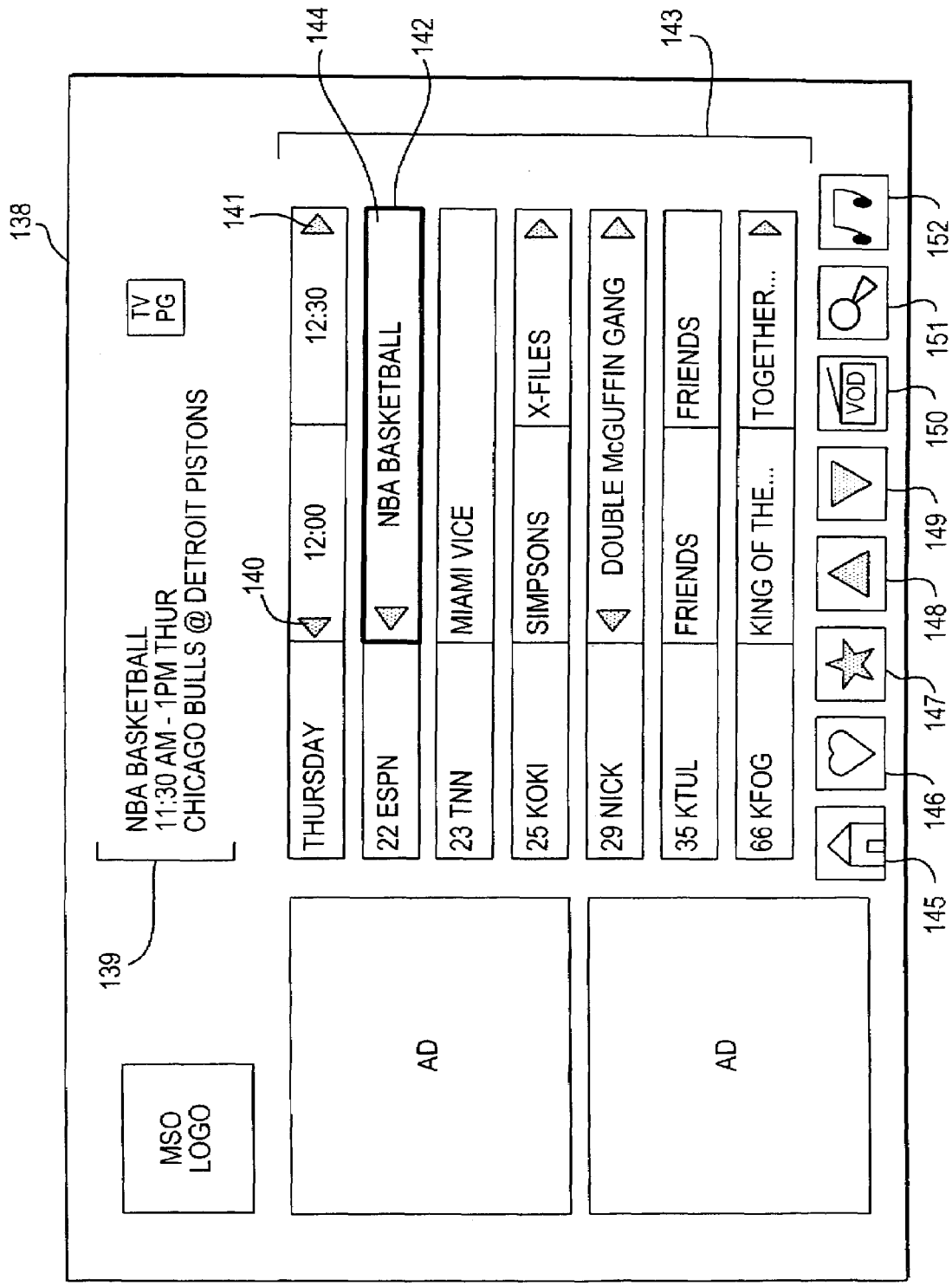
FIG. 8 shows an illustrative program guide screen in accordance with the present invention.

An illustrative program guide screen 138 that may be displayed for the user is shown in FIG. 8. Program guide screen 138 may be displayed, for example, when the user selects program listings option 122 of FIG. 7, when the user selects a suitable option from within an interactive television program guide application or other interactive television application, or when the user presses an appropriate remote control button such as guide button 96 or otherwise uses user input interface 118 to indicate a desire to view program listings.

Program guide screen 138 may contain a grid or list of program listings 143. Program listings 143 may include program titles, channels, scheduled broadcast times, and any other suitable program schedule information. Highlight region 142 may be used to select a desired program listing 144. Program Information for selected programs may appear elsewhere on program guide screen 138 (e.g., in program information display region 139). If the user presses OK key 84 when a program listing for a current program is highlighted, the interactive television application may tune to the channel for that program. If the user presses OK key 84 when a program listing for a future program is highlighted, the interactive television application may provide the user with an opportunity to set a reminder for that program or to record that program.

Other functions that the interactive television application may provide include the ability to set favorites or establish preferences or other settings. For example, the user may select a particular channel for the program guide to automatically tune to when the user equipment is turned on. The user may also select favorite programs, favorite channels, etc. The program guide or other interactive television application may provide the user with the ability to establish parental control settings, the ability to search for programming of interest, and the ability to view program descriptions, advertisements, text, graphics, and video, etc. These are merely illustrative examples of interactive television functions that may be provided by interactive television system 10. Other suitable interactive television functions may be provided if desired.

A user may access program listings (e.g., program listings of the type shown in FIG. 8) by using the interactive television application to select an onscreen option such as option 122 and 123 of FIG. 7, by pressing a dedicated guide button such as guide button 96 on remote control 72, by selecting any other suitable button or on-screen option, etc. In the example of FIG. 8, program listings are currently being displayed for television programs that air between 12:00 noon and 1:00 PM. As shown by arrows 140 and 141, the user may use right or left cursor keys to navigate to other times (e.g., to direct the interactive television application to display appropriate screens of program listings 143 for different time periods). If desired, the user may select options or press keys (or use user input interface 118 to otherwise enter suitable commands) that direct the interactive television application to display-program listings organized by channel, by genre, by service type (e.g., pay-per-view or regular broadcast television), etc.

Selectable options, such as options 145, 146, 147, 148, 149, 150, 151, and 152, may be provided as part of program guide screen 138 or any other program guide screen for providing access to various interactive television application features. For example, option 145 may be used to display a home screen or main menu, such as menu screen 120 of FIG. 7. Option 146 may be selected to display program listings for channels designated by the user as "favorites." Option 147 may be selected to display listings of recommended programs using highlight region 142. Scroll indicators 148 and 149 may be used to navigate down and up through program listings. Option 150 may be selected to display information related to video-on-demand services. Option 151 may be selected to search television program listings by title, time, category, or any other suitable criteria. Option 152 may be selected to display information related to digital music services.

Figure 9:
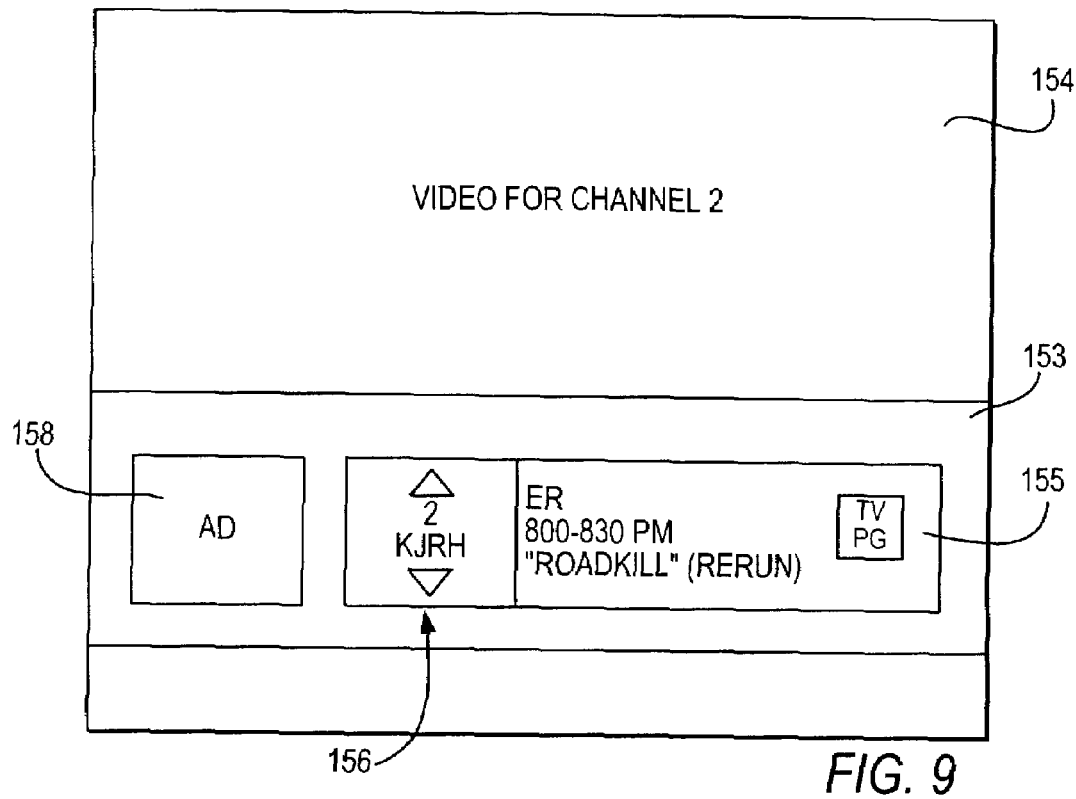
FIG. 9 is an illustrative display screen showing how a flip banner that contains program listings information for the current channel may be displayed as an overlay over video of the current channel in accordance with the present invention.

The interactive television application may provide a "flip" tuning feature. As shown in FIG. 9, when the user invokes the flip mode, flip display 153 may be provided over a portion of a channel (i.e., channel 2) that the user is currently tuned to and is watching on display screen 154. Flip display 153 contains information (in region 156) on the program 155 appearing on the current channel (channel 2) to which the set-top box 60 or other user equipment is tuned. The user may change the channel using channel up and down keys on the remote control or using user interface 118 to issue other suitable channel change commands. This simultaneously changes the channel to which the set-top box 60 or other user equipment is tuned and the channel information displayed in region 156 (and the associated program information 155).

The flip display 153 may be removed manually or automatically (e.g., after a few seconds or other suitable time period of user inactivity). When the user starts changing channels again, the flip display 153 may be displayed again.

The flip feature of the interactive television application therefore allows the user to view program information for the channel that the user is currently viewing as the user changes channels. In the example of FIG. 9, the flip display 153 is displayed in the form of an overlay on top of the current channel. If desired, the video for the current channel may be reduced in size and the flip information (e.g., the program title and channel information for the current program) may be displayed at a location on the periphery of the reduced-size video (e.g., at the bottom, side, or top of the reduced-size video).

An advertisement 158 or other content may be provided in the flip display region if desired. Other optional information that may be displayed in flip display 153 includes information on the scheduled broadcast times for the program 155, ratings information, program descriptions, and other program-related information.

Figure 10:
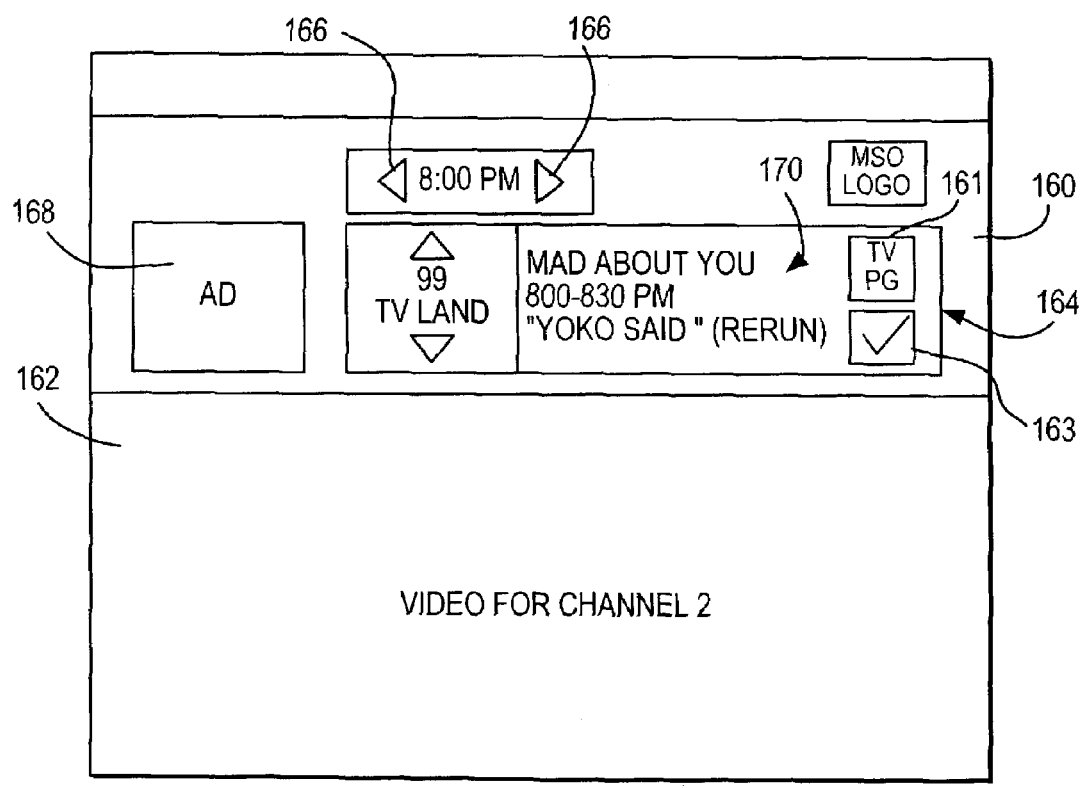
FIG. 10 is an illustrative display screen showing how a browse banner that contains program listings information for a channel that may differ from the current channel may be displayed as an overlay over video of the current channel in accordance with the present invention.

The interactive television application may also be used to provide a browse feature. As shown in FIG. 10, when the user invokes the browse feature (e.g., by pressing an up or down cursor key), browse display 160 may be displayed as an overlay over a portion of the channel (i.e., channel 2) that is being displayed on the user's display screen 162 and to which the user is currently tuned. Browse display 160 may initially contain information on the current channel. For example, browse display 160 may, when initially invoked by the user, contain the title of the current program and information on the current channel such as the current channel number, call letters, and network logo.

When the user presses the up or down cursor key (or enters other suitable commands using user interface 118), the browse display may be changed to display information on the programming available on other channels. In the example of FIG. 10, the user has pressed the cursor keys repeatedly, until the user has browsed to channel 99. The video that is being displayed on display screen 162 has not changed in this example (channel 2 is still being displayed).

As indicated by arrows 166, the user may use right and left cursor keys 82 (or other suitable controls) to browse to other time slots (e.g., to view information related to programming that is scheduled for broadcast at a later time). Browse display 160 may contain an advertisement 168, information 170 on scheduled program times, program descriptions and other program-related information and icons such as check icon 163 (to indicate that a reminder has been set for a given program) and ratings icon 161.

If the user locates a currently available program of interest on another channel, the user may press the OK key 84 to direct the interactive television application to tune the user equipment to that channel.

The browse display 160 may-be removed manually or may be removed automatically from display screen 162 after a suitable period of user inactivity (e.g., after a few seconds or a minute or two).

If desired, the browse display can be displayed on the periphery of the video for the current program rather than as an overlay. The video for the current channel may be reduced in size accordingly.

Figure 11:
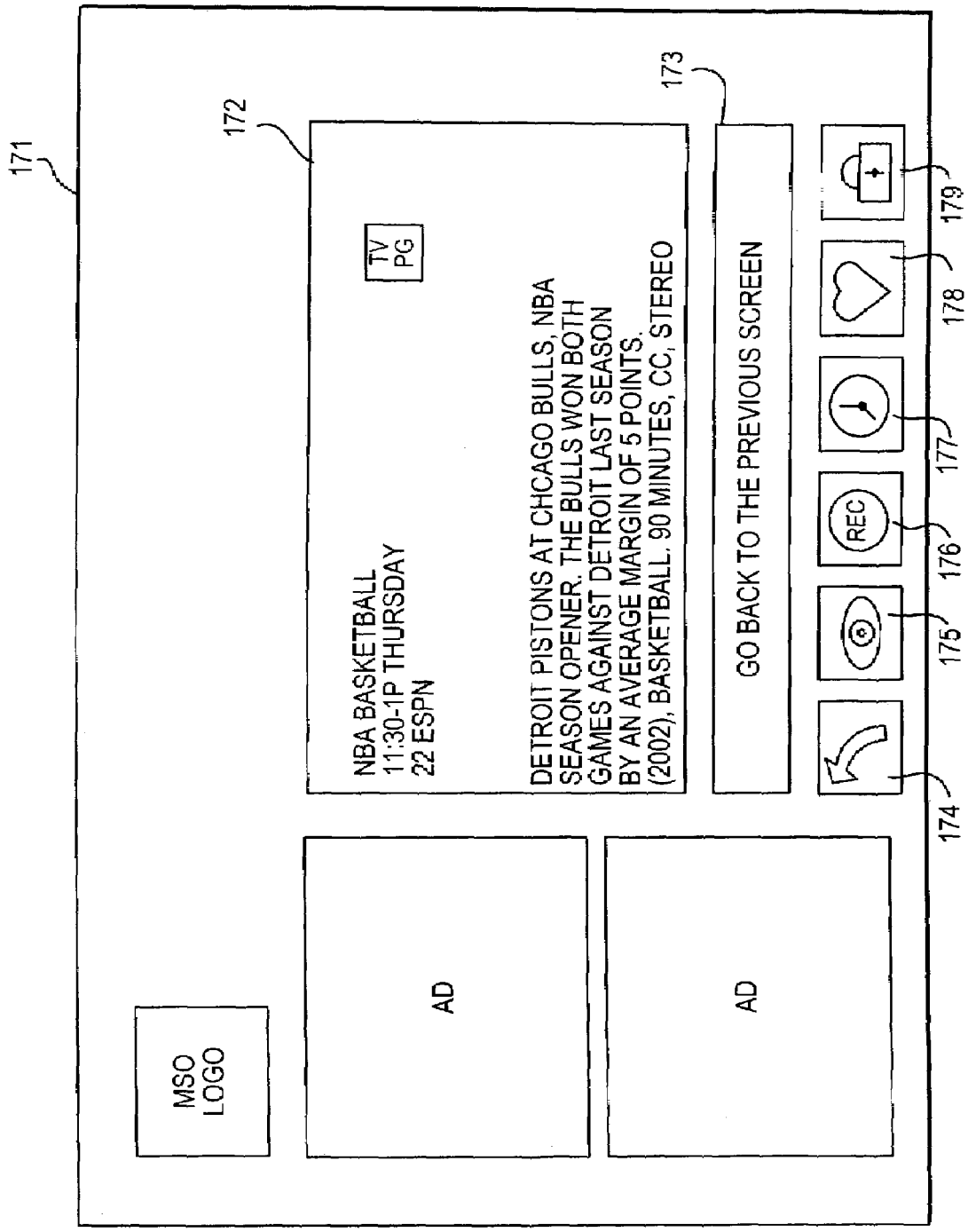
FIG. 11 shows an illustrative program guide screen in accordance with the present invention.
Figure 12:
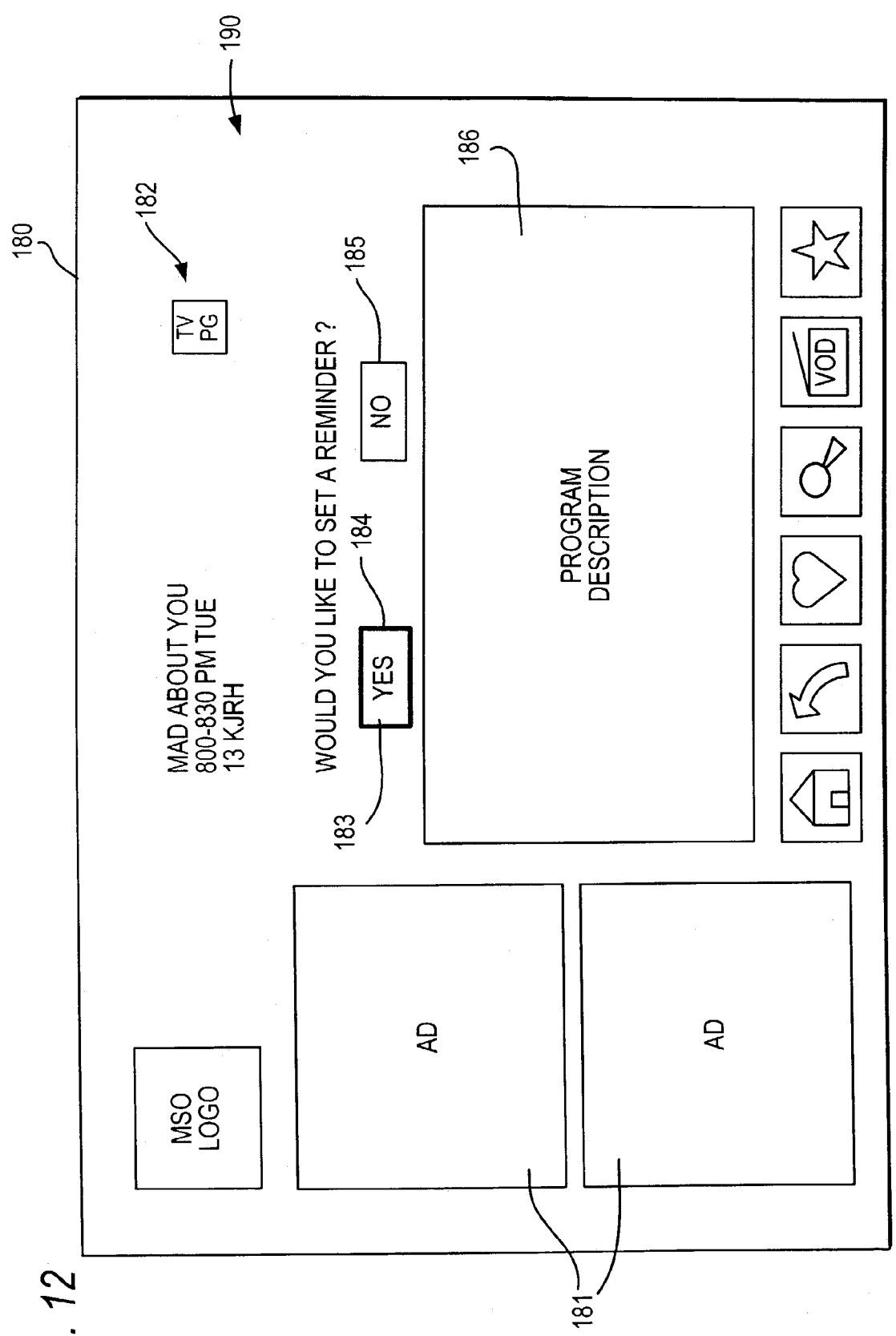
FIG. 12 is an illustrative display screen showing how an interactive television application may provide a user with an opportunity to set a program reminder in accordance with the present invention.

When the user has indicated interest in a program (e.g., by positioning highlight region 142 of FIG. 8 on top of a given program listing, by tuning to a program, by viewing a program listing on the flip banner of FIG. 9 or the browse banner of FIG. 10, etc.), the user may press info key 90 (FIG. 4) to obtain more information for that program. Illustrative info screens 171 and 180 that may be displayed when a user presses info button 90 are shown in FIGS. 11 and 12, respectively. Screens such as screens 171 and 180 may be provided when a user selects a program listing from a interactive television application screen (e.g., program guide screen 138 of FIG. 8). Info screen 171 of FIG. 11 may include a detailed description 172 of a program selected by the user. Description 172 may include, for example, the title, time, channel, and rating of the program, or any other suitable information. As in FIG. 8, selectable options may be provided as part of info screen 171 to provide access to various interactive television application features. For example, option 174 may be used to return to the previous program guide screen. Option 175 may be used to tune to the selected program or set a reminder for the selected program (e.g., the program for which information is displaying in description 172). Option 176 may be selected to display recording options and services for the selected program. Option 177 may be selected to display options for adding a reminder for the selected program. Option 178 may be used to display options for adding the selected program or channel to a user's favorites, and option 179 may be used to display options for providing a parental lock on the selected program. Selectable options for other interactive television application features may also be provided. A highlight region may be used to select any of the selectable options provided by a program guide screen. Information describing a highlighted option may be provided, for example, in information display region 173.

Information screens may include advertisements. For example, info screen 180 of FIG. 12 may include selectable advertisements 181. Information regions on screen 180 such as title region 182 and program description region 186 may be used to display information on the selected program such as title information, ratings information, plot summary information, information about actors, genre, critics ratings, etc.

Region 190 may be used to inform the user of the possibility of setting a reminder for the selected program, of tuning to the channel showing the selected program, of recording the selected program, of purchasing the selected program if it is a pay-per-view program, of parentally controlling the selected program, of configuring a related profile or preference settings, or performing any other suitable action related to the selected program Region 190 may also be used to provide additional information related to the selected program. The user may position highlight region 184 on top of either yes option 183 or no option 185 or any other suitable options (e.g., options to tune to the channel, to record the program, to purchase the program, to parentally control the program, to configure the preference settings, etc.). When the user presses the OK key 84, the interactive television application may then take appropriate actions. If the user opts to set a reminder for the program listed in the info screen 180, the interactive television application may display a pop-up reminder overlay on top of the video for the channel that the user is currently watching just before the program associated with the reminder is scheduled to begin, or any suitable display screen that is active at the time that the reminder pops up (e.g., a program listings screen).

Figure 13:
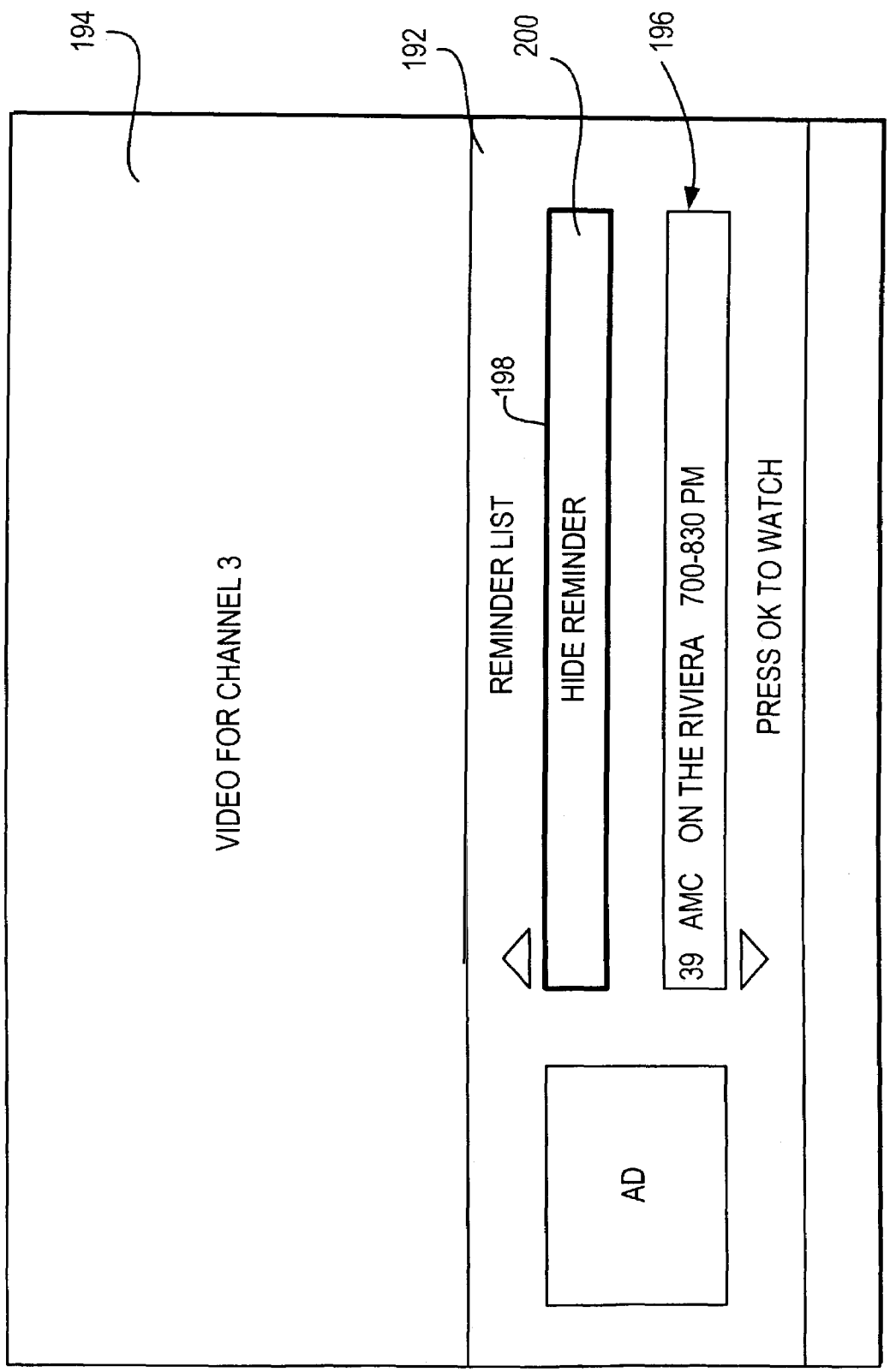
FIG. 13 is an illustrative display screen showing how a reminder may be provided for a user in accordance with the present invention.

An illustrative reminder is shown in FIG. 13. In the example of FIG. 13, the user is watching channel 3. The current time is 6:58 PM. Previously, the user set a reminder for the program "On The Riviera," which is scheduled to be shown on channel 39 at 7:00 PM. Because the program for which the user set the reminder is just about to begin, the interactive television application displays reminder list 192 as an overlay on top of the video for channel 3 that is being presented on display screen 194. The reminder list may contain a list of one or more programs for which the user has set reminders. In the example of FIG. 13, one program listing 196 ("On The Riviera") is displayed.

The user can tune to a program by selecting that program from the reminder list 192. For example, the user may position highlight region 198 on listing 196 and may select that listing by pressing the OK key 84. The interactive television application may then tune the user to the channel for the desired program (i.e., channel 39 in this example).

The user can close the reminder list by pressing the OK key 84 while hide reminder option 200 is highlighted.

The reminder list may be displayed at any suitable time (e.g., at 0-15 minutes before the program of interest is to begin, at a user-selected time before that program, etc.). Moreover, the reminder list may be displayed around the periphery of the video for the current channel and the video for the current channel may be displayed in a reduced-size window. These are merely illustrative examples. Any suitable arrangement may be used to notify the user of upcoming programs or in-progress programs for which the user has set reminders and other programs of interest.

Figure 14:
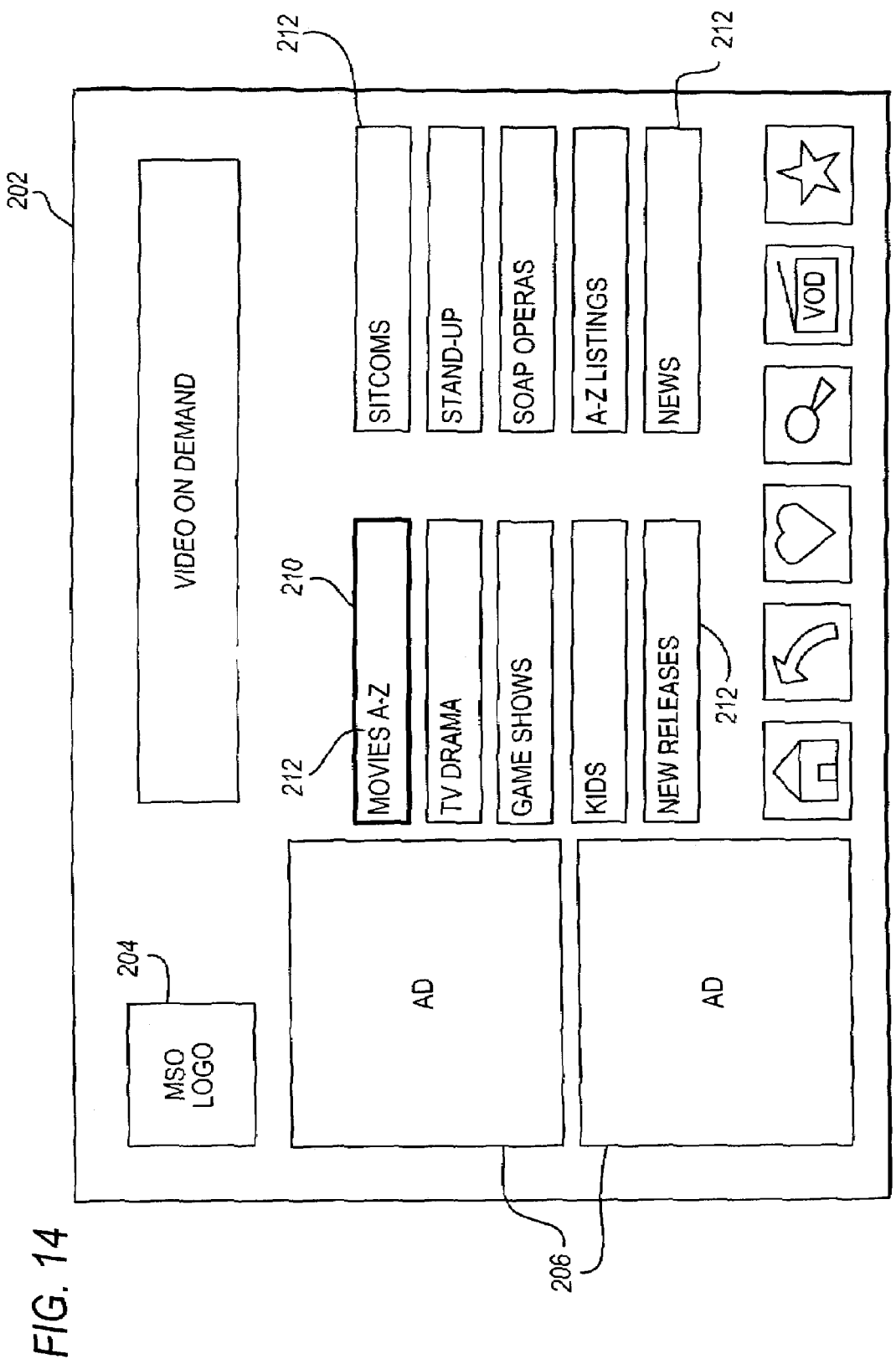
FIG. 14 is a display screen showing an illustrative video-on-demand menu that may be used to select a category of video-on-demand content in accordance with the present invention.

The interactive television application may be used to provide the user with access to video-on-demand content. The user may, for example, be provided with an option such as video-on-demand option 128 on menu screen 120 of FIG. 7. When the user selects option 128, the interactive television application may display a screen such as video-on-demand categories screen 202 of FIG. 14. Screen 202 may include logos such as logo 204, selectable (or non-selectable) advertisements such as advertisements 206, and a screen title 208. The user may position highlight region 210 on an option 212 corresponding to a video-on-demand category of interest.

Figure 15:
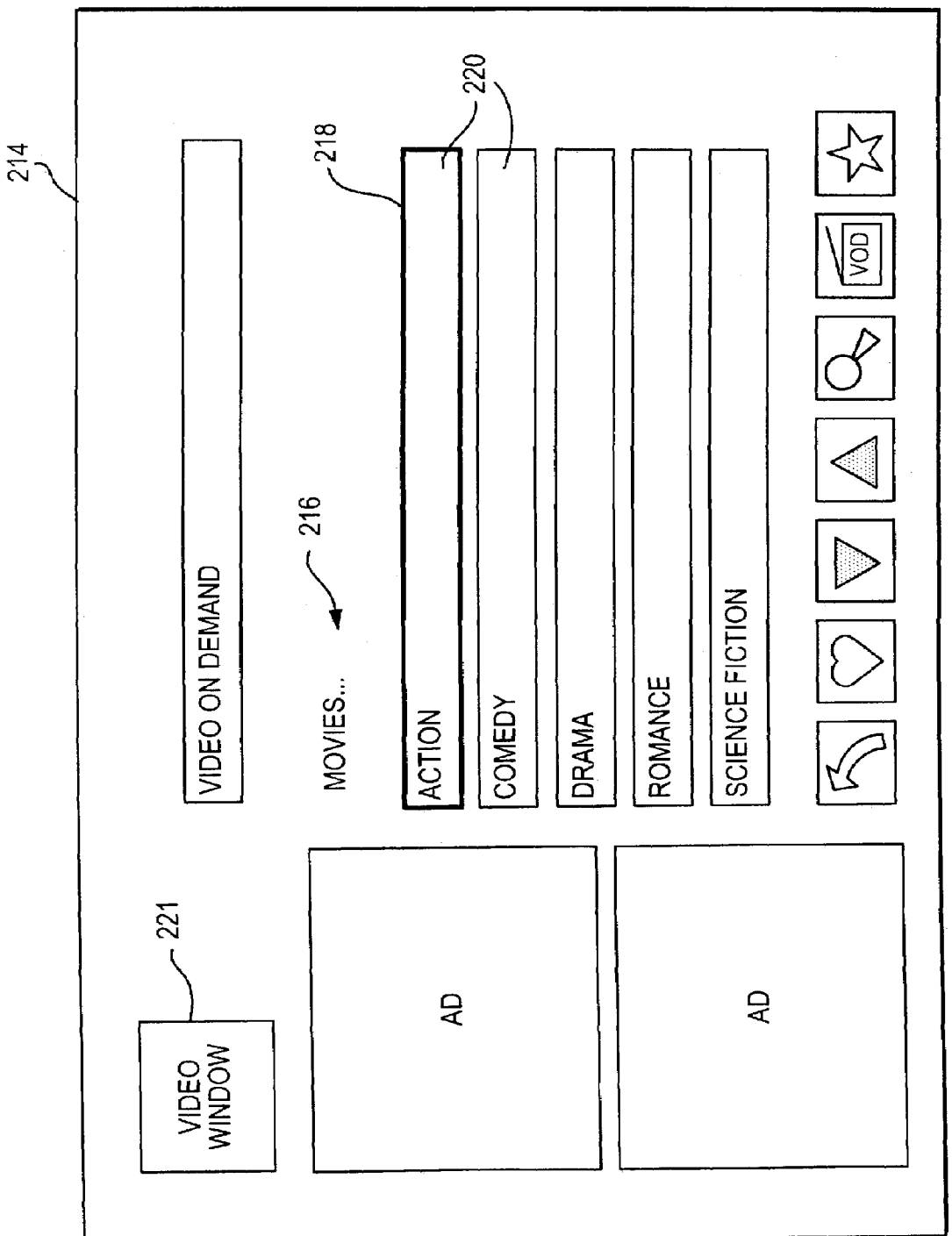
FIG. 15 is a display screen showing an illustrative video-on-demand menu screen that may be used to locate a desired type of movie in accordance with the present invention.

When the user selects the video-on-demand category of interest from screen 202, the interactive television application may display a display screen such as subcategory selection screen 214 of FIG. 15. In the example of FIG. 15, the subcategories screen 214 contains subcategory options 220 corresponding to movies, because (in this example) the user selected movies A-Z option 212 from screen 202 in FIG. 14. Video window 221 may be provided in any video-on-demand information screen and may provide information relating to a video-on-demand program selected by the user or any other suitable video information.

Figure 16:
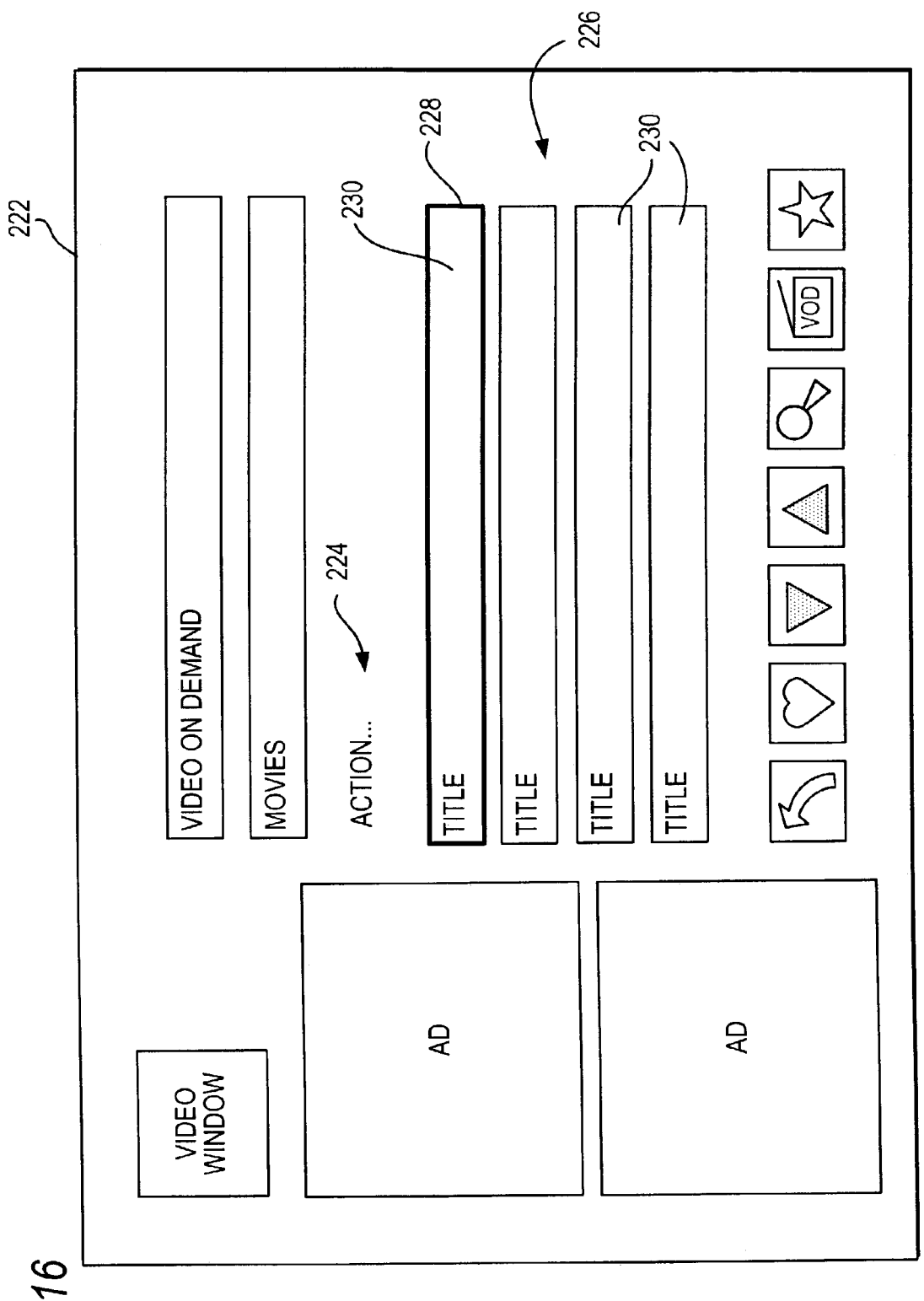
FIG. 16 shows an illustrative title menu that may be used to select a video-on-demand title of interest in accordance with the present invention.

The user may position highlight region 218 onto a desired subcategory 220 and may press OK key 84 to view a list of available video-on-demand content associated with that subcategory. An illustrative display screen 222 that the interactive television application may display for the user when the action subcategory option 220 (FIG. 15) is selected is shown in FIG. 16. As shown in FIG. 16, display screen 222 may include information identifying the selected subcategory 224. Screen 222 may also include a list 226 of titles 230 (or other content indicators). The user may position highlight region 228 on a desired video-on-demand title 230 and may press the OK key to proceed with the selection of that title.

Figure 17A:
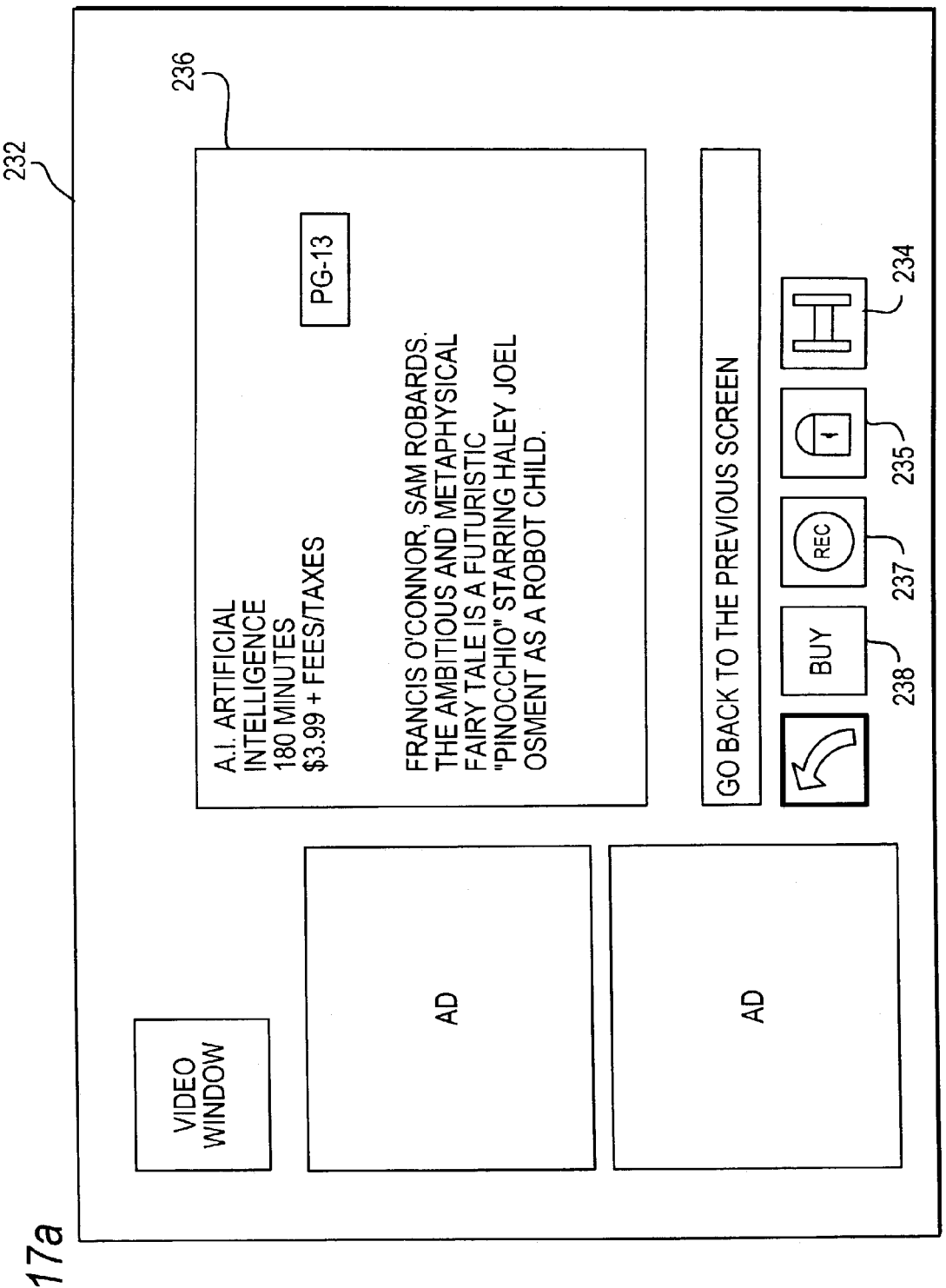
FIGS. 17a and 17b are illustrative video-on-demand screens that may be used to order and access video-on-demand content in accordance with the present invention.

Selecting a desired video-on-demand title 230 from title selection screen 222 may direct the interactive television application to display a video-on-demand information screen such as information screen 232 of FIG. 17a. Screen 232 may include information 236 on the selected video-on-demand content, such as title, run time, price, rating, and a description of the selected video-on-demand content.

Selectable options, such as options 234, 235, 237, and 238 may be provided as part of screen 232 to provide access to various interactive television application features. For example, option 238 may be selected to access options for ordering the selected video-on-demand content. Option 237 may be used to access options for recording the selected content, and option 235 may be used to access options for setting parental control locks for the selected content. If the user selects option 234, the interactive television application may display a video clip containing information on the video-on-demand content of interest (e.g., a promotional video such as a preview, a trailer, a review, etc.). The video clip may be delivered to the user equipment 18 from a server such as server 36 or server 56 of FIG. 1 or from equipment at a service provider such a service provider 50. The interactive television application may also provide the user with additional information on the video-on-demand content in response to the user selecting option 234. Other suitable selectable options may also be provided on screen 232 (e.g., a program package information and purchase option, options for searching program listings for related content, etc.).

Figure 17B:
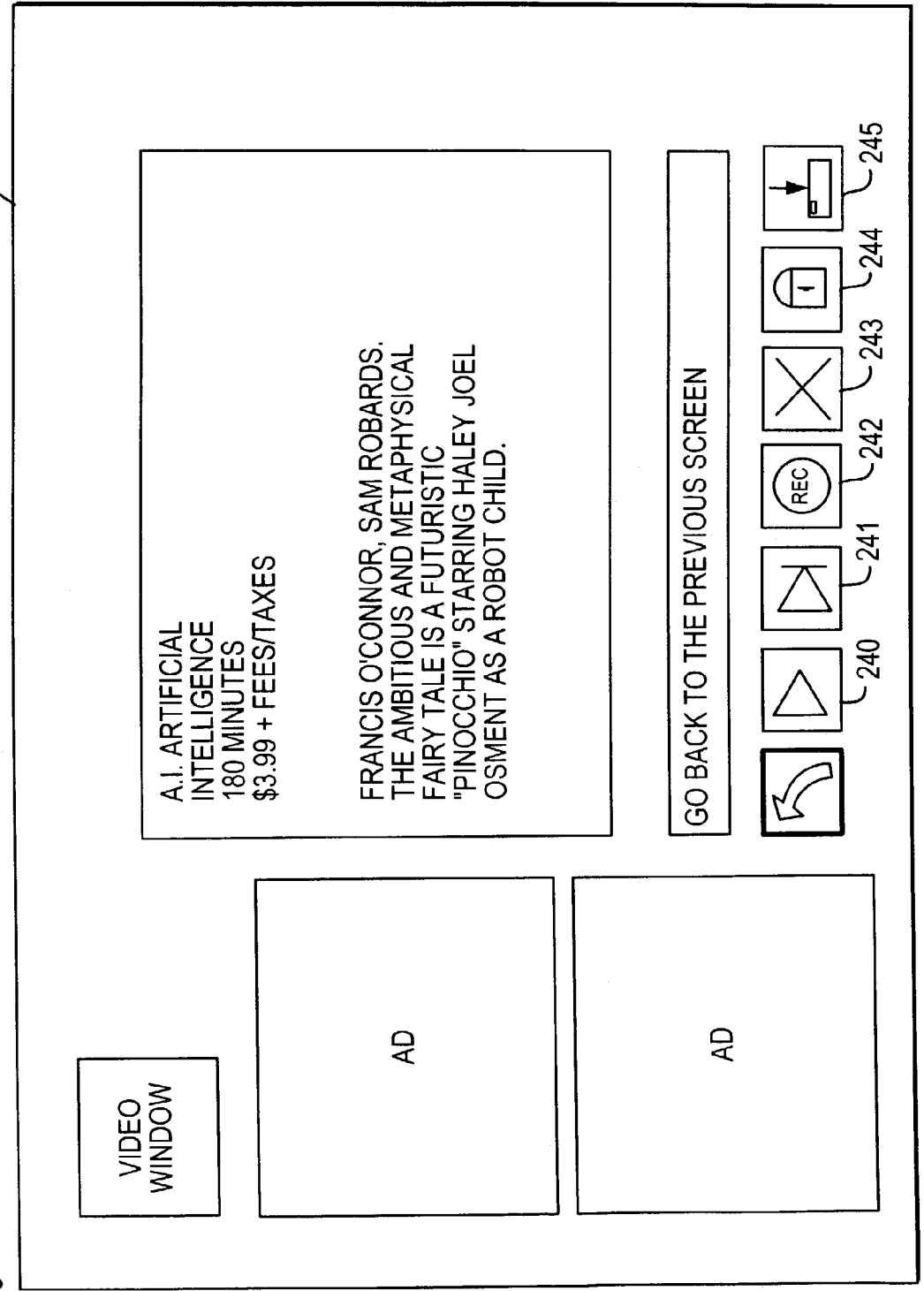

If a user requests information for video-on-demand content that has already been ordered, the interactive television application may provide video-on-demand information screen such as screen 239 of FIG. 17b, which may include selectable options different than those provided for screen 232 of FIG. 17a. For example, option 240 may be used to start playing selected video-on-demand content from the program position most recently viewed. Option 241 may be used to present the selected content from the beginning, and option 242 may be used to access options for recording the content. Option 243 may be used to remove the selected content from a listing of the ordered and available content. Option 244 may be used to access options for setting parental control locks for the selected content. If the selected content is being accessed over a network or being provided by a network storage device, option 245 may be used to store the content on a local storage device.

In response to a user ordering selected content (e.g., by selecting an on-screen order option such as option 238 of FIG. 17a, or by using remote control 72 or any other suitable input device 118 to order content, etc.), the interactive television application may deliver the ordered video-on-demand content to the user equipment from a server such as server 36 or server 56 or from a service provider such as service provider 50. The communications paths and communications network 34 of FIG. 1 may be used in delivering the requested content.

Figure 18:
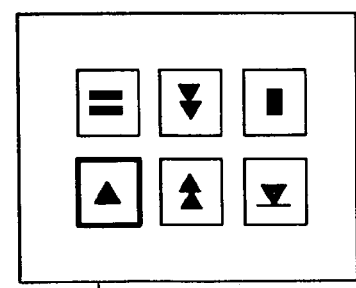
FIG. 18 is an illustrative display screen showing how video-on-demand playback controls may be displayed while video-on-demand content is being displayed for the user in accordance with the present invention.

The ordered video-on-demand content may be displayed for the user on a display screen such as video-on-demand playback screen 246 of FIG. 18. As shown in the lower portion of screen 246, interactive options may be displayed in a toolbar 248 or other suitable format. The interactive options 248 (or similar remote control buttons) may allow the user to rewind the video-on-demand content to the beginning, rewind, play, fast-forward, pause, stop delivery of the video-on-demand content, or perform other video playback options. The arrangement of FIG. 18 is merely illustrative. For example, the video-on-demand content may be played back in a reduced size window (of fixed or user-selectable size).

The interactive television system 10 may be used to support video recorder functions. The video recorder functions may be supported using local arrangements (e.g., arrangements in which a personal video recorder or other suitable equipment in the user's home is used to record videos on a local hard drive or other storage device) and network-based arrangements (e.g., arrangements in which network equipment such as servers 36 and 56 or equipment at a service provider such as service provider 50 is used to store video and data for the user). Combinations of these arrangements may also be supported using system 10.

In a local video recorder arrangement (sometimes called a personal video recorder arrangement or local digital video recorder arrangement), video recordings are stored locally on the user equipment. Information on which videos have been recorded may also be maintained locally. Program guide information (e.g., titles, rates, descriptions, categories, etc.) may also be maintained for the recorded videos. When a user desires to view a list of the recordings that the user has stored on the user equipment, the interactive television application may retrieve this information from local storage and may display this information to the user locally on user equipment 18. The user may then select a desired recording to play back.

In a network-based video recorder arrangement (sometimes called a client-server video recorder arrangement), videos may be stored on the network (e.g., at servers such as servers 36 and 56 or at a service provider such as service provider 50). Information on which programs have been recorded for the user may be stored locally and on the network (e.g., at servers such as servers 36 and 56 or at a service provider such as service provider 50).

Network-based recordings may be made in a number of ways. For example, some or all of the regularly-broadcast television programming provided by programming sources 12 may be automatically recorded or copies of this programming otherwise maintained on a suitable network storage device such as server 36, server 56, or equipment at a service provider such as service provider 50. If the user chooses to "record" a program, no actual recording need be made, because a copy of the desired program already exists on the system. With this type of arrangement, virtual recordings take the place of real recordings.

The user may be given a "personal area" on the network. The personal area may be accessed when the user enters an appropriate personal identification number or by virtue of the user's connection to the network through a known or trusted communications path (e.g., when the user is connected through a dedicated cable path to a server at a cable system headend such as a server 56 at television distribution facility 14 of FIG. 1).

The personal area may be used to maintain a list of the video content that the user has recorded. Whenever the user directs the network-based video recorder portion of the interactive television system to make a recording, the system updates the user's personal area to make it appear as though an additional "real" copy of the requested recording has been made. The network-based video recorder implemented with this approach therefore conserves storage space, while providing users with the illusion of access to a network-based video recorder dedicated to their personal use.

Alternatively, there may be no personal area and each user may have access to all previously recorded content to which they had rights when originally broadcast.

As another example, some or all of the content for which a user requests that a recording be made may be recorded by creating actual copies (e.g., digital recordings) of the requested content. These actual copies may be stored on network equipment (e.g., servers such as servers 36 and 56 or equipment at a service provider such as service provider 50).

Programs recorded onto a network server may be copied to a user's local storage.

A combination of these approaches may be used if desired. For example, some content may be automatically retained by the system (e.g., copies of popular programming). The user may make virtual recordings of this material. The presence of the virtual recordings may be reflected in the user's personal area. Other content may be stored in the form of actual recordings at the direction of the user (e.g., less popular content). The presence of these recordings may also be reflected in the user's personal area.

Regardless of the way in which network-based recordings (virtual or real) and local recordings are made, the interactive television application may be used to provide the user with interactive display screens that assist the user in making recordings, managing recordings (e.g., editing recordings, deleting recordings, renaming recordings, sending recordings to other users over the communications paths of FIG. 1, etc.), playing back recordings, viewing information about recorded programs, etc.

Figure 19A:
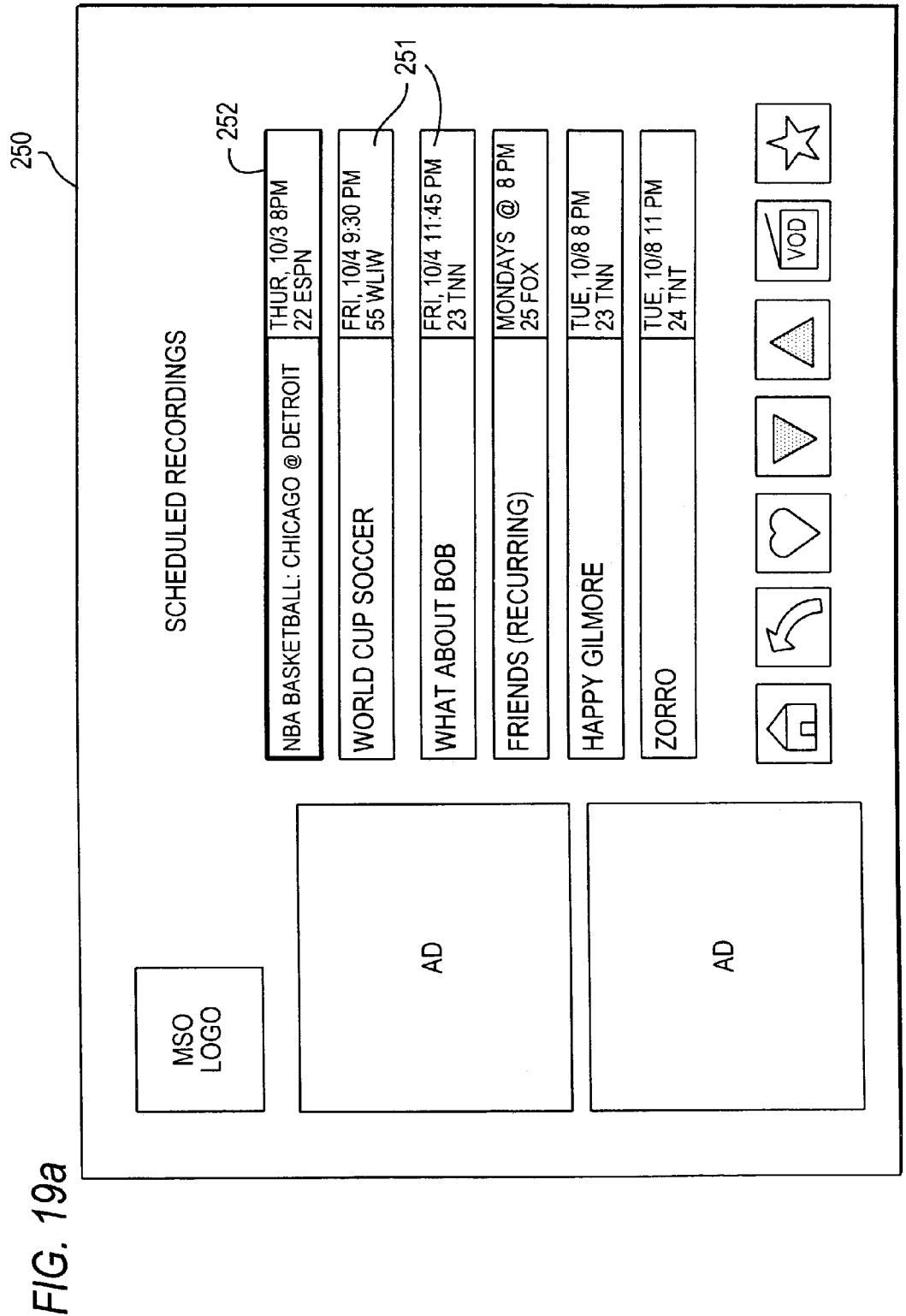
FIG. 19 is an illustrative display screen showing how a user's scheduled recordings may be presented in the form of an interactive list in accordance with the present invention.

Once a program has been selected by a user for recording, the selected program may be presented in an interactive list of programs scheduled to be recorded. An illustrative scheduled recordings screen 250 that may be displayed for the user on user equipment 18 is shown in FIG. 19a. Screen 250 may be displayed by the interactive television application when the user selects an option provided by another program guide screen, such as program guide screen 120 of FIG. 7 or any other suitable option. Screen 250 may include, for example, a list of programs scheduled to be recorded 251. A highlight region 252 may be used to select a scheduled recording from the list. The user may position highlight region 252 on a desired scheduled recording and select the scheduled recording using an appropriate key of remote control 72.

Figure 19B:
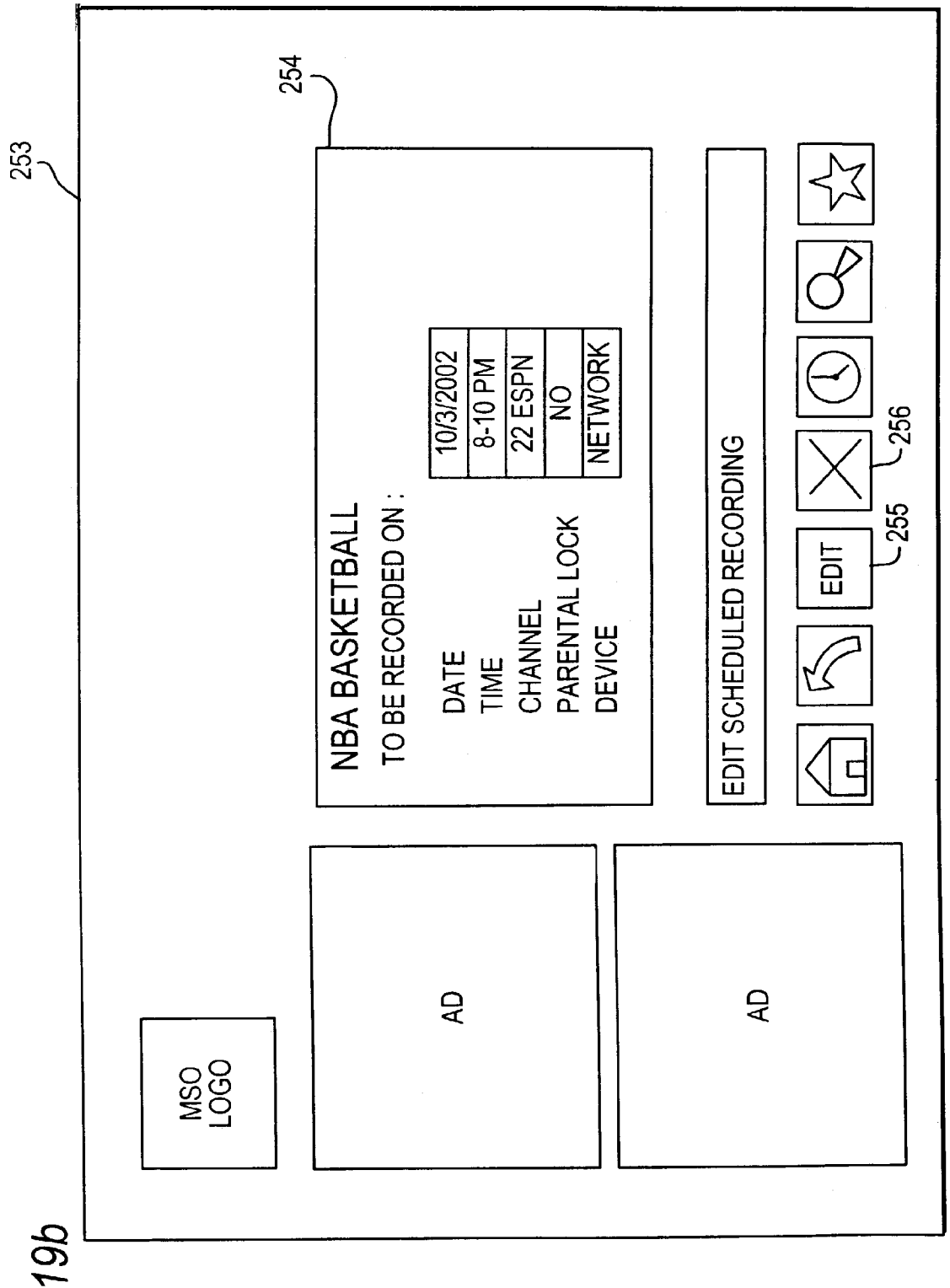

Information about a scheduled recording selected by the user may be presented in a screen such as screen 253 of FIG. 19b. Screen 253 may include scheduled recording information 254, which may show the date, time, and channel for which a program is to be recorded. Information 254 may also indicate which device has been designated to record the program and whether a parental lock is set for the program scheduled to be recorded. The user may edit information 254 by selecting edit option 255 using a highlight region. Other selectable options may be provided in screen 253, for example cancel option 256 which the user may select to cancel the scheduled recording.

Figure 20A:
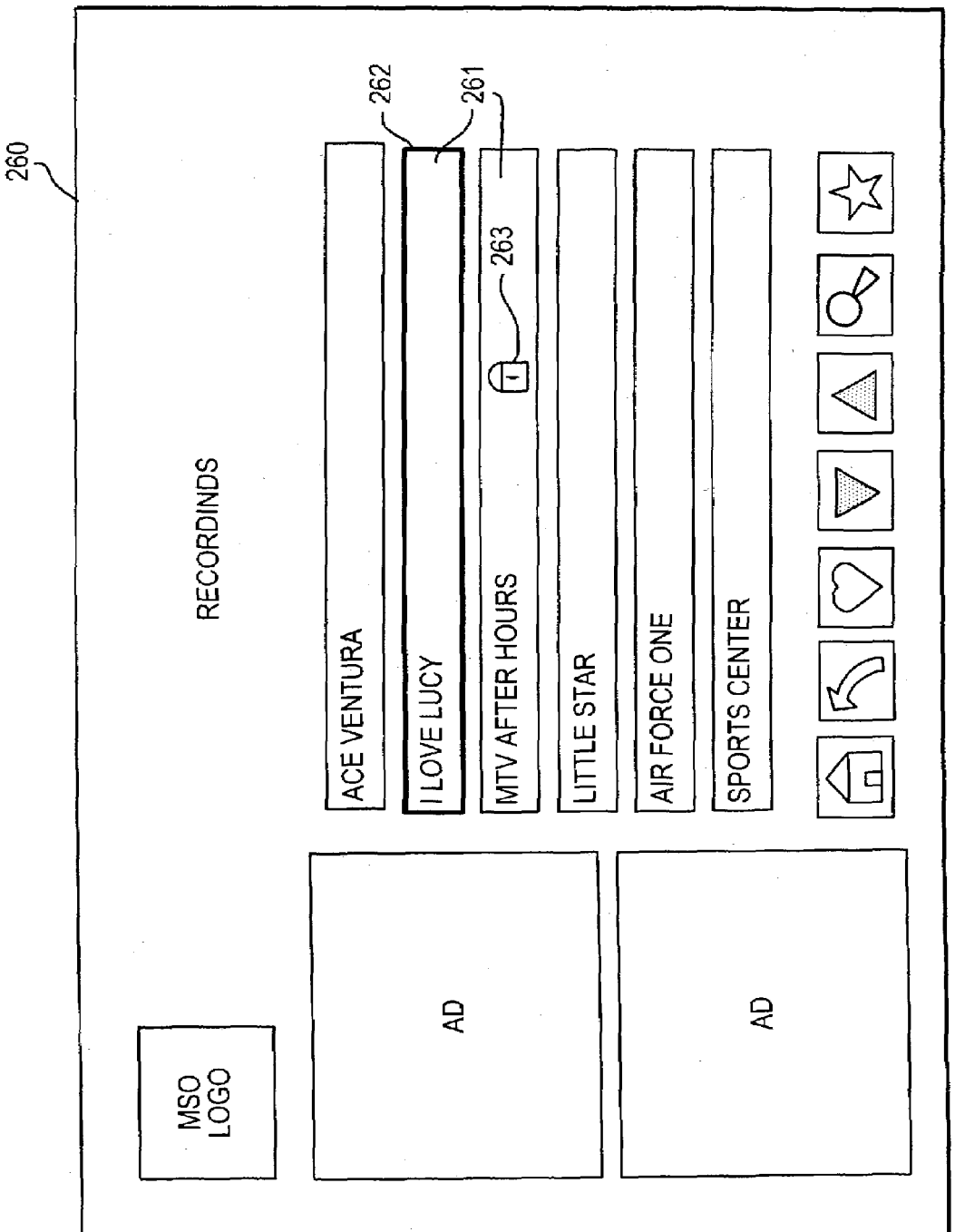
FIG. 20 is an illustrative display screen showing how a user's recordings may be presented in the form of an interactive list in accordance with the present invention.

Once a program has been recorded, a program guide screen may be presented to display recorded programs. An illustrative video recordings screen 260 that may be displayed for the user on user equipment 18 is shown in FIG. 20. Screen 260 may be displayed by the interactive television application when the user selects an option provided by another program guide screen, such as program guide screen 120 of FIG. 7 or any other suitable option. The recordings 261 may be local recordings that are stored on the user's equipment 18 or may be real or virtual network-based recordings (e.g., network-based content stored on equipment such as server 36 or server 56 or at service provider 50). In a network-based video recorder environment with a personal area, screens such as screen 260 provide access to all or part of the user's personal area. The user may navigate through the personal area using remote control 72 or other suitable user interface 18.

Screen 260 may include a list of the user's recordings 261. Recording listings may include the time and channel the program was recorded or any other suitable information. The user may position highlight region 262 to select a recording of interest (e.g., to view that recording, to view information about that program, to delete the program, etc.). The user may position highlight region 262 on a desired recording and select the recording using an appropriate key of remote control 72.

Figure 20B:
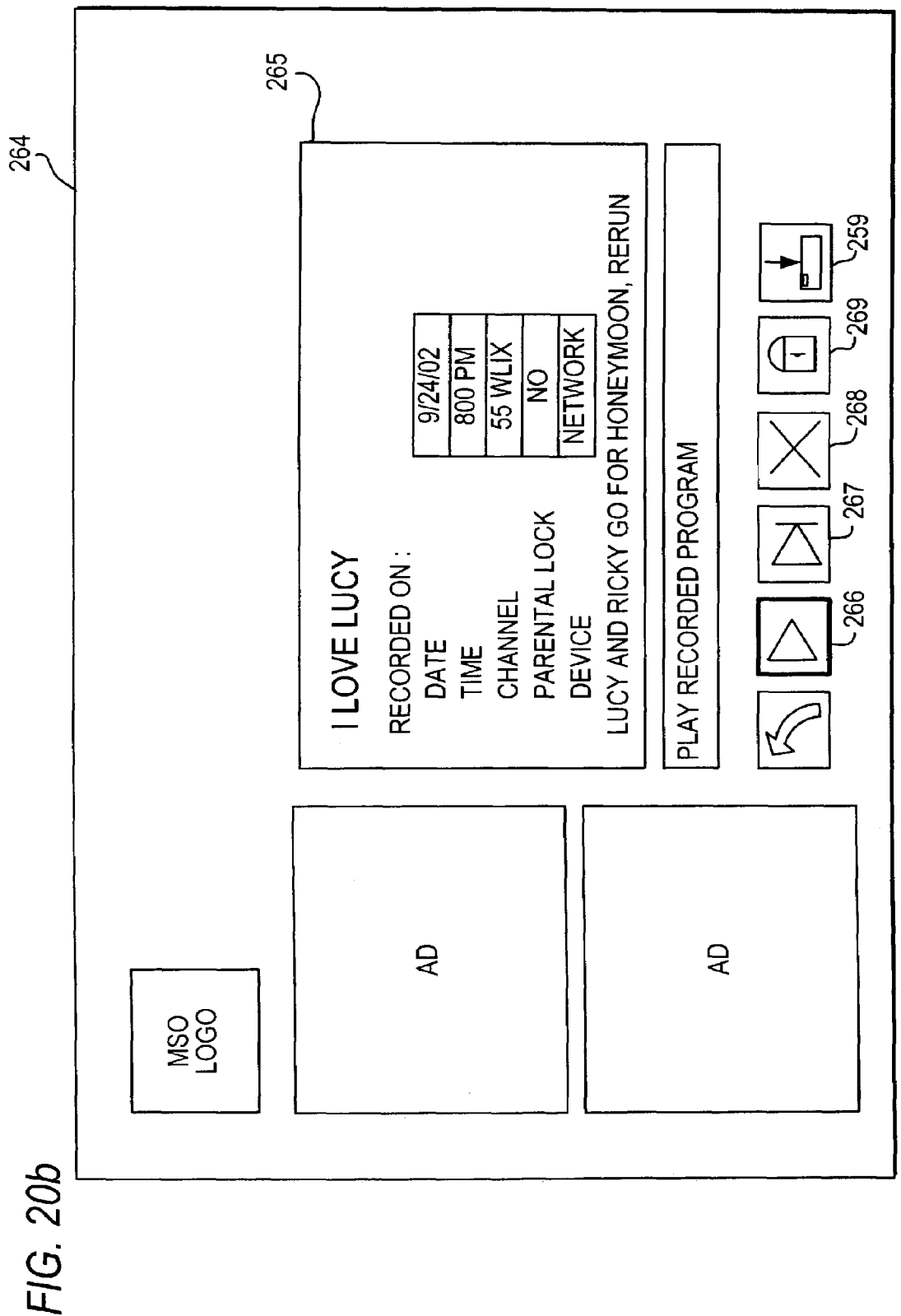

Information about a recording selected by the user may be presented in a screen such as screen 264 as illustrated in FIG. 20b. Screen 264 may include recording information 265, which may show the date, time, and channel the program was recorded. Information 265 may also show whether a parental lock is set for the recording and what device has been designated to store the recording. The user may play the recording by selecting option 266. The user may play the selected recording from the beginning by selecting option 267. Option 268 may be selected to delete the recording from the list of recordings. Option 269 may be used to set a parental lock for the selected recording. If the selected recording is being stored on a network video storage device, the user may select option 259 to transfer the recording to a local storage device. Onscreen options may be selected using a highlight region and a remote control, or by any other suitable method.

Figure 21:
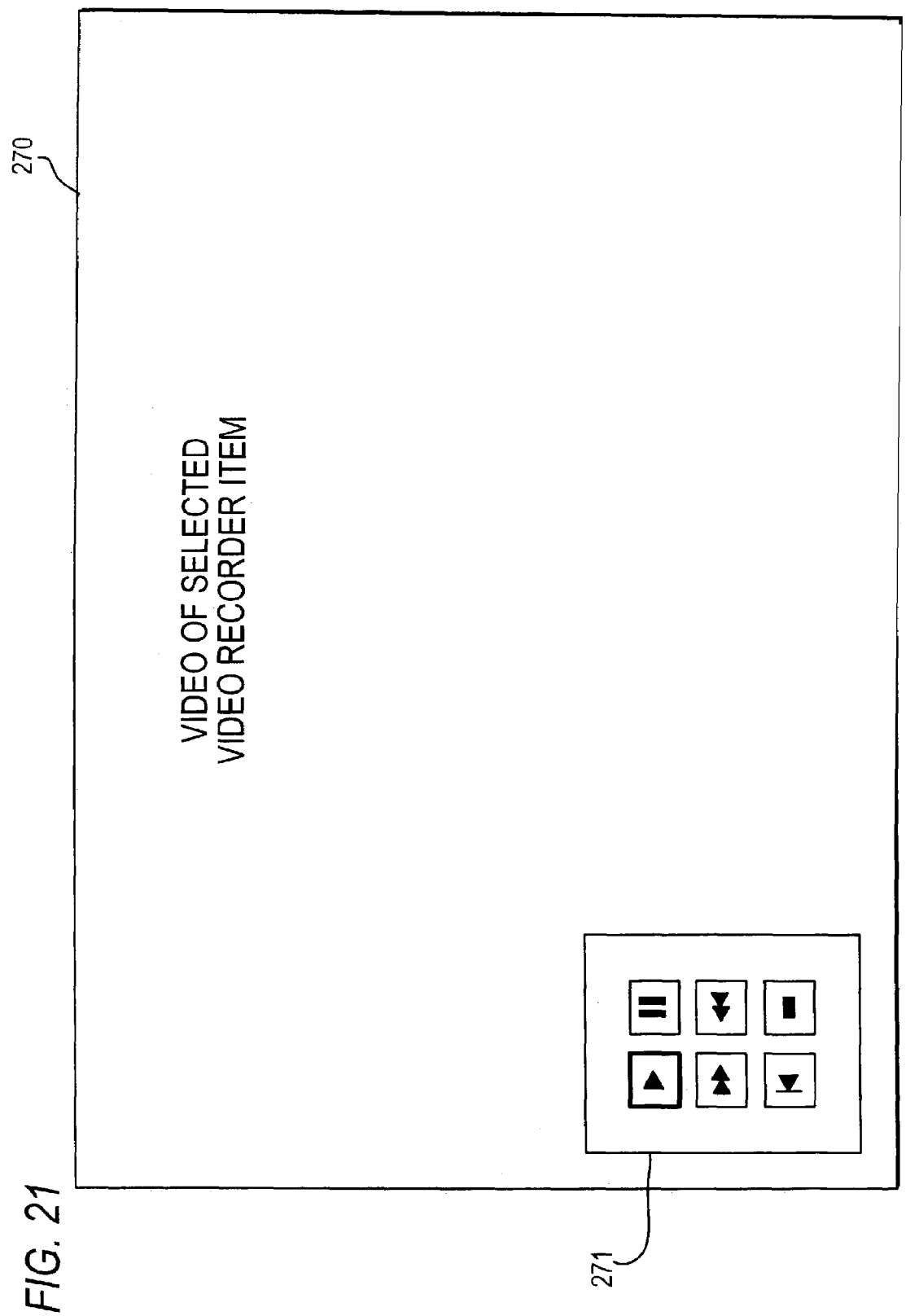
FIG. 21 is an illustrative display screen showing how video for a recording selected from the list of FIG. 18 may be displayed for the user in accordance with the present invention.

When a given recording is selected for play back, for example by selecting play option 266, a display screen such as display screen 269 of FIG. 21 may be presented. Display screen 269 may include the video 270 of the selected program that is being played back to the user and options 271 for controlling the video. Options 271 may, for example, include options that allow the user to rewind the video to the beginning, to rewind or reverse the video, to play the video, to fast-forward the video, to pause the video, or to stop the video. Control of these functions and other interactive television application functions may be supported using on-screen options, dedicated or multi-purpose keys on remote control 72 or other user devices, or other suitable arrangements involving user interface 118. When onscreen options are used, the options may be displayed in the form of one or more overlays on top of video 270 or video 270 may be provided in a reduced-size window and the options displayed outside of this window.

With the arrangement of FIGS. 20 and 21, the user can browse the user's recordings and can play back (and control the playback) of these recordings. Recordings that are stored locally on user equipment 18 may be played back by retrieving these recordings from the local hard drive or other storage on which the recordings are maintained. Recordings that are stored on the network may be played back from the network equipment on which the recording content is stored. User equipment 18 may receive such content in the form of a real-time video stream or a file download and the interactive television application may play back the received content using a display screen arrangement of the type shown in FIG. 21.

The user may record programming by indicating interest in a program for recording by highlighting a program of interest on a suitable display screen provided by the interactive television application and pressing a record key, by selecting a program for recording from a flip or browse display, by tuning to a desired program and selecting an appropriate record button, by selecting a record option from an information screen, etc. For example, the user may highlight a program in a program listings screen such as screen 138 of FIG. 8, or may display a program listing of interest on a flip display such as flip display 153 of FIG. 9 or on a browse display such as browse display 160 of FIG. 10. When the user presses a suitable remote control key such as record key 86 of FIG. 4, the interactive television application may record the desired program.

Figure 22:
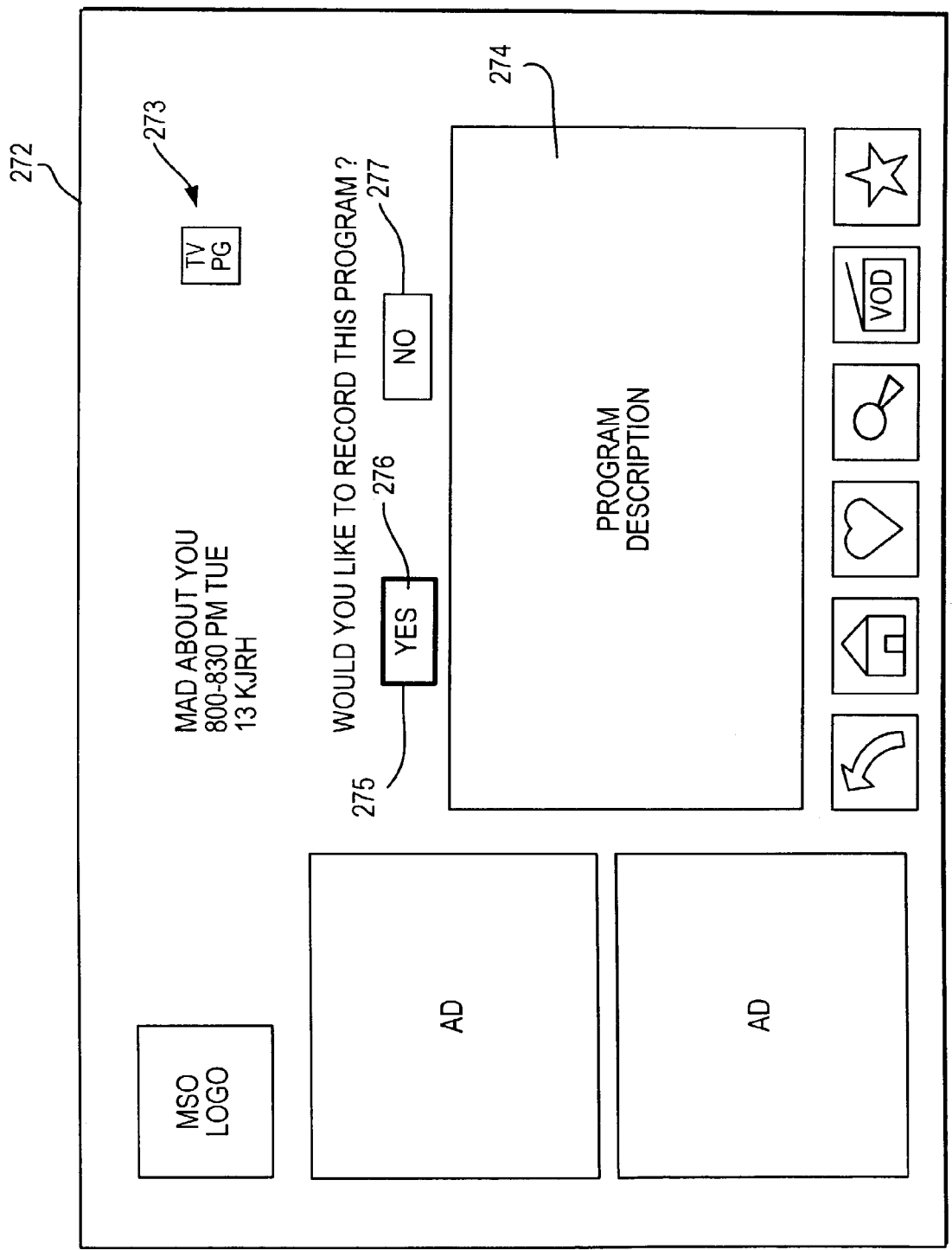
FIG. 22 is an illustrative display screen showing how the user may be provided with options that allow the user to schedule a recording of a desired program in accordance with the present invention.

The interactive television application may automatically record the program that the user selected or may provide one or more additional confirmation and information screens after the user presses the record key 86. As an example, the interactive television application may display a screen such as record set-up screen 272 of FIG. 22. As shown in FIG. 22, screen 272 may include title and ratings information in region 273 and a program description 274. The user may be provided with information on the scheduled broadcast time for the selected program. If the user desires to record the program, the user may position highlight region 275 on top of YES option 276 and may press OK key 84. If the user does not wish to record the program, the user may position highlight 275 on top of NO option 277 and may press the OK key 84. If desired, other options such as series recording options, recording quality options, and buffer time options may be provided.

When the user directs the interactive television application to record a given program, the interactive television application will record the program using the local capabilities of user equipment 18 or using the network-based video recorder capabilities of the system 10, depending on the equipment of the user, the capabilities of system 10, and system and user settings.

After the program has been recorded, the user may use the interactive television application to view information on the user's recordings (e.g., using a display screen arrangement of the type shown in FIG. 20). These techniques for supporting recording functionality in the interactive television application are merely illustrative. Any suitable arrangement for recording (as real recordings or as virtual recordings and locally or on network equipment) may be used if desired.

The interactive television application may allow the user to establish parental control settings. For example, the user may lock a particular program, a program rating, a channel, a type of content (e.g., violent or sexual content), or may establish a parental control setting that blocks all television viewing during a particular period of time. A user may be required to enter a personal identification number (PIN) to unlock blocked content.

With one illustrative arrangement, a parent (or other suitable user) may select a program to block by highlighting the program listing for that program in a suitable program listings screen (e.g., a screen such as screen 138 of FIG. 8). After highlighting the program to be blocked, the parent may press lock key 92 on remote control 72 (FIG. 4). The parent may also access options for setting parental locks by selecting an on-screen parental control lock option provided by the interactive television application (e.g., option 234 of FIG. 17a, option 244 of FIG. 17b, etc.).

Figure 23A:
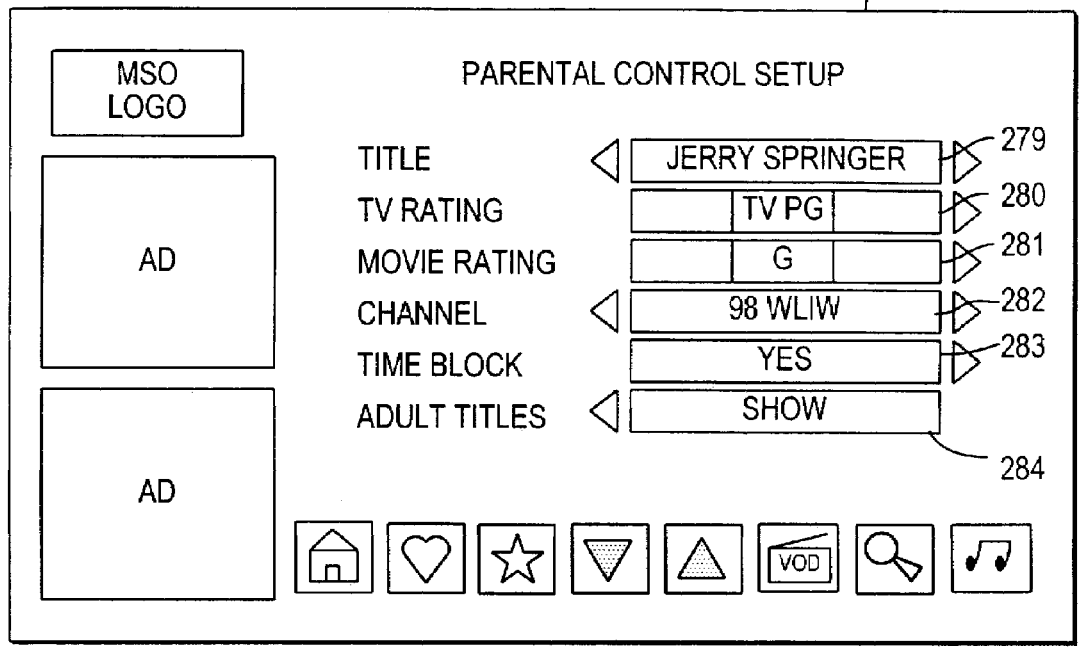
FIG. 23a is an illustrative display screen showing how a user may set parental controls for a given program in accordance with the present invention.

In response to a user selecting an on-screen option or remote control key to access parental control lock options, the interactive television application may display a display screen such as parental controls display screen 278 of FIG. 23a. Parental controls options may be accessed from a main menu, a selected program, or any other suitable program guide screen. Users may set parental locks for a selected program or a range of programming by selecting from various criteria. For example, users may select to block programs according to title 279, TV rating 280, movie rating 281, channel 282, or any other suitable criteria. Block ratings options 280 and 281 may allow users to block all programming with a given rating (e.g., the same rating as the selected program or a user-input rating or range of ratings). The user may be provided with other options for applying parental lock settings by selecting, for example, (YES/NO) time block option 283. A user may also select to hide or show adult titles by selecting option 284. Other selectable options may also be provided in screen 278.

Figure 23B:
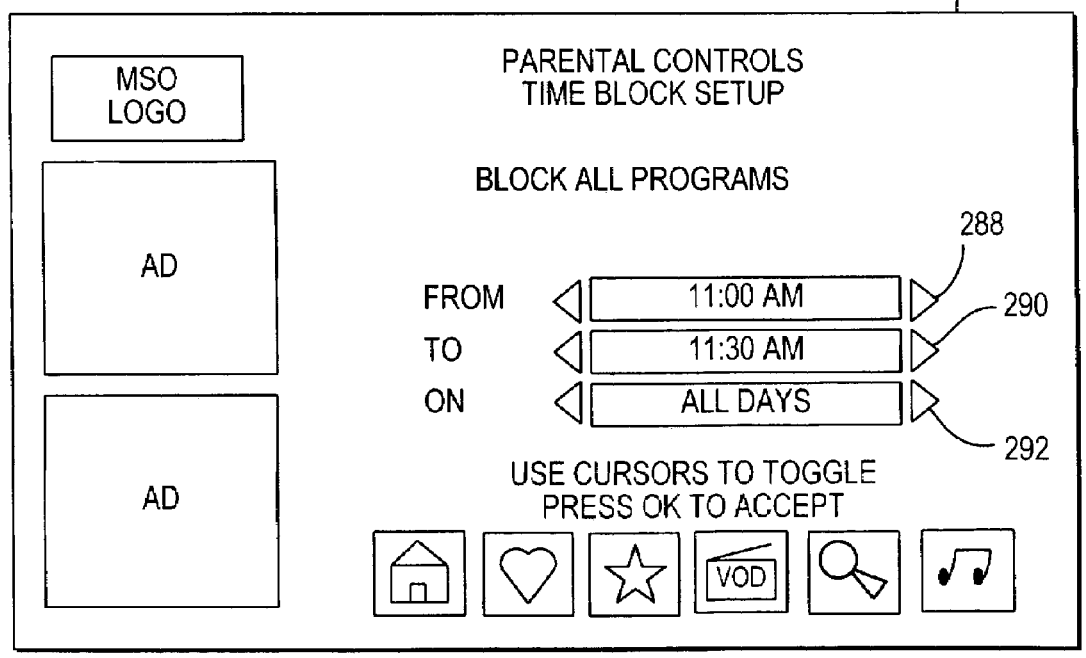
FIG. 23b is an illustrative display screen showing how a user may block content by creating a time-based parental control setting in accordance with the present invention.

If the user has selected "YES" for time block option 283, a time block sub-menu may be provided, for example, screen 286 of FIG. 23b. The user may use the on-screen options of screen 286 to set a beginning time (option 288) and ending time (option 290) for the parental control time period. The user may use option 292 to make the parental control setting effective for all days of the week, certain groups of days (e.g., week days or weekend days), or a particular day or days. The user may press OK key 84 when finished. Other selectable options may also be provided as part of screen 286.

The parental control screens 278 and 286 of FIGS. 23a and 23b are merely illustrative. Any suitable on-screen options or other user interface arrangement may be used to allow a parent (or other user) to block (parentally-control) programming airing during a particular period of time, programming on a particular channel or channels, programming with a certain rating, individual instances of certain programs, etc.

The interactive television application may provide users with an opportunity to record a variety of video content (e.g., in addition to the video-on-demand movies and other content previously discussed). For example, the interactive television application may be configured to provide users with an opportunity to record video related to selectable displays provided by the interactive television application and selected by a user (e.g., advertisements for television programming, products or services, television program reviews, logos, promotions or event, channel listings, portal links, options for interactive services, real-time content such as sports scores, stock quotes, news, weather, etc.).

Figure 24:
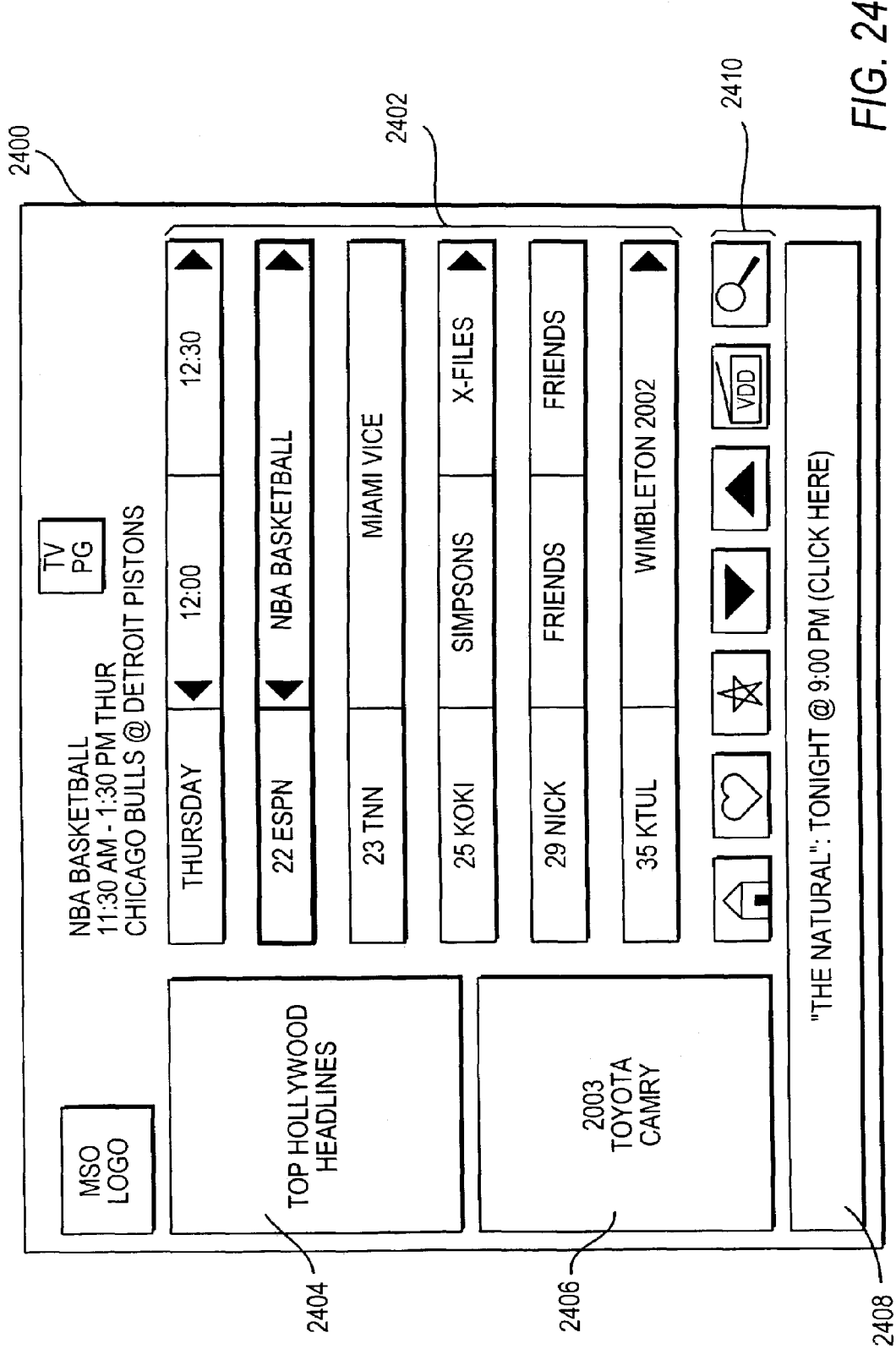
FIG. 24 is an illustrative display screen showing how the user may be provided with an opportunity to select a selectable advertisement in accordance with the present invention.

Selectable displays may be presented to a user in an interactive television program guide screen such as program listings screen 2400 of FIG. 24. Program listings screen 2400 may be displayed, for example, when the user selects program listings-option 124 of FIG. 7, when the user selects a suitable option from within an interactive television program guide application or other interactive television application, or when the user presses an appropriate remote control button such as guide button 96 or otherwise uses user input interface 118 to indicate a desire to view program listings (e.g., "selecting").

Program listings screen 2400 may include selectable options 2410 for accessing various interactive television application features and television program guide content such as a grid or list of television program listings 2402. Program guide content such a selectable displays (e.g., selectable advertisements or other selectable guide content) may also be provided as part of program listings screen 2400. For example Top Hollywood Headlines advertisement 2404, Toyota Camry advertisement 2406, or "The Natural" banner advertisement 2408 may be provided in any media format, such as text, images, video, audio, any other suitable media format, or a combination thereof.

The user may select one of the selectable advertisements 2404, 2406, or 2408 to access additional guide content relating to the selected advertisement. For example, Headlines advertisement content screen 2500 of FIG. 25 may be provided in response to the user selecting Top Hollywood Headlines advertisement 2404. Headlines advertising content screen 2500 may include information source indicator 2502, which may be, for example, a television channel or any available source of information (e.g., a video-on-demand database, a website, etc.). The title of the advertisement may be provided in advertisement title heading 2504.

Figure 25:
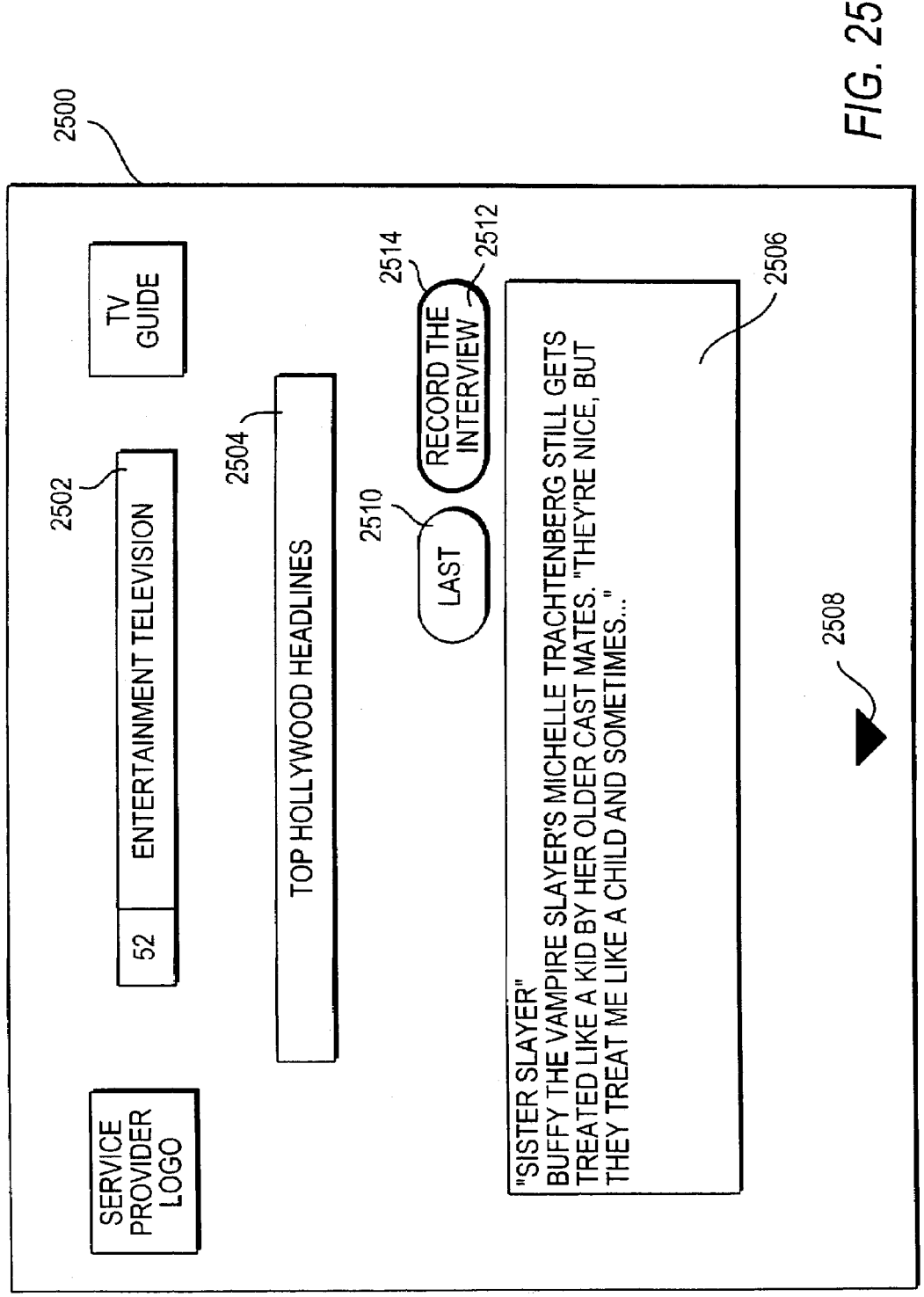
FIG. 25 is an illustrative display screen showing how the user may be provided with additional information about a selected advertisement and a selectable record option in accordance with the present invention.

Content summary caption 2506 may be provided to present the user with a detailed description of the selected advertisement. In the example of FIG. 25, the Top Hollywood Headlines advertisement selected by the user includes information relating to an interview with Michelle Trachtenberg, star of the popular television series Buffy the Vampire Slayer. The user may select scroll option 2508 to view additional content in summary caption 2506. Last option 2510 may be provided as part of Headlines advertisement content screen 2500 to provide the user with an opportunity to exit Headlines advertising content screen 2500 and return to a previous screen in the television program guide (e.g., program listings screen 2400 of FIG. 24).

The user may also be provided with an opportunity to record video related to the content provided in Headlines advertising content screen 2500. For example, in FIG. 25 the user is provided with an opportunity to record the interview by selecting record the interview option 2512. The user may use cursor keys 82 of remote control 72 (FIG. 4) to position highlight region 2514 on record the interview option 2512 and may select to record the related video using OK key 84 of the remote control. Other techniques for selecting the record related video option 2512 may also be used. Upon selecting record the interview option 2512, an interactive television application may record the selected related video.

The interactive television application may record related video in conjunction with a network-based video recorder device and application or a local personal video recorder device and application, if available. In a personal video recorder arrangement, the interactive television application may be used to record video locally on the user equipment in response to the user commands. In a network-based video recorder arrangement, the interactive television application may be used to record video or to make virtual recordings on network equipment such as server 36, 56, or equipment at service provider 50 in response to the user commands. The user commands may be provided to the network equipment over the communications paths shown in FIG. 1. The personal video recorder arrangement and the network-based video recorder arrangement can support functions such as fast-forward, rewind, pause, play, and record. A local or remote storage device may be used to store the recording.

The system may have a fixed time to record any specific video (e.g., 2:00 AM). Alternatively, the user may configure a default option of when to record these types of videos, for example on a setup screen. Or, the user may be given a choice of when to record a video when selecting to record the specific video. When the recording is about to start, the application may determine if the user is using the interactive television system, for example, based on the amount of time since the most recent user interaction. The application may display a notice at the start of the recording, allowing the user, if present, to cancel or postpone the recording. The application may allow the user to interrupt the recording at any time while in progress by pressing a key on the remote control and confirming that the recording is to be cancelled or postponed.

Figure 26:
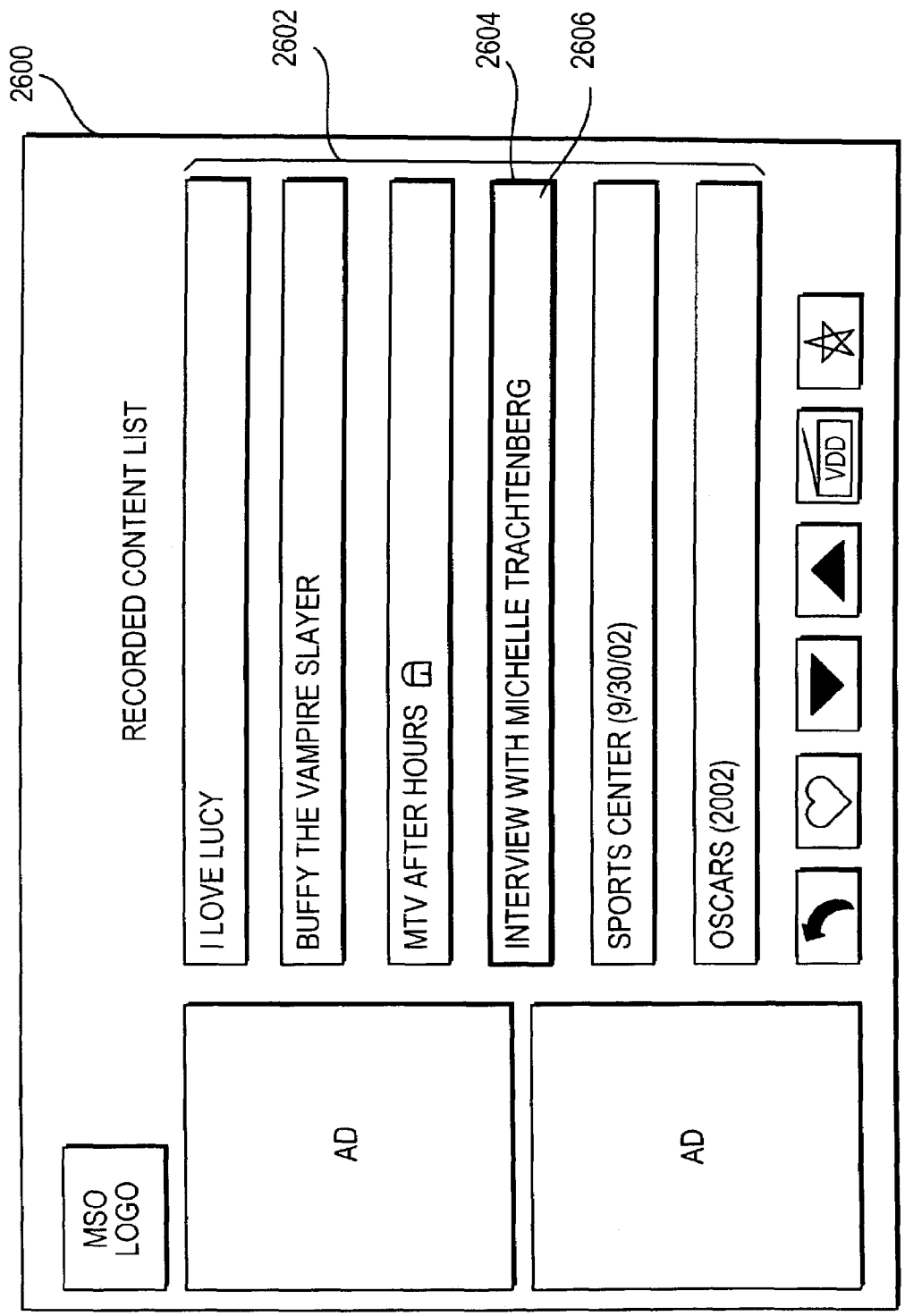
FIG. 26 is an illustrative display screen showing how a users' recordings may be presented in the form of an interactive list in accordance with the present invention.

Once the interactive television application has recorded the related video to the user's local or remote storage device, recorded content screen 2600 in FIG. 26 may be provided having recorded content list 2602. Recorded content list 2602 may list all content stored on the user's local or remote storage device, for example movies, events, serial television programs, video related to selectable displays for guide content (e.g., advertisements, promotions, etc.), or any other suitable subset of available recorded content. The example illustrated in FIG. 26 shows recorded video listing 2606 selected with highlight region 2604. Recorded video listing 2606 identifies the user's stored recording of the interview with Michelle Trachtenberg, recorded in response to the user selecting record the interview option 2512 of FIG. 25. The user may select a recording for viewing using highlight region 2604 and selecting an appropriate key from remote control 72.

Figure 27:
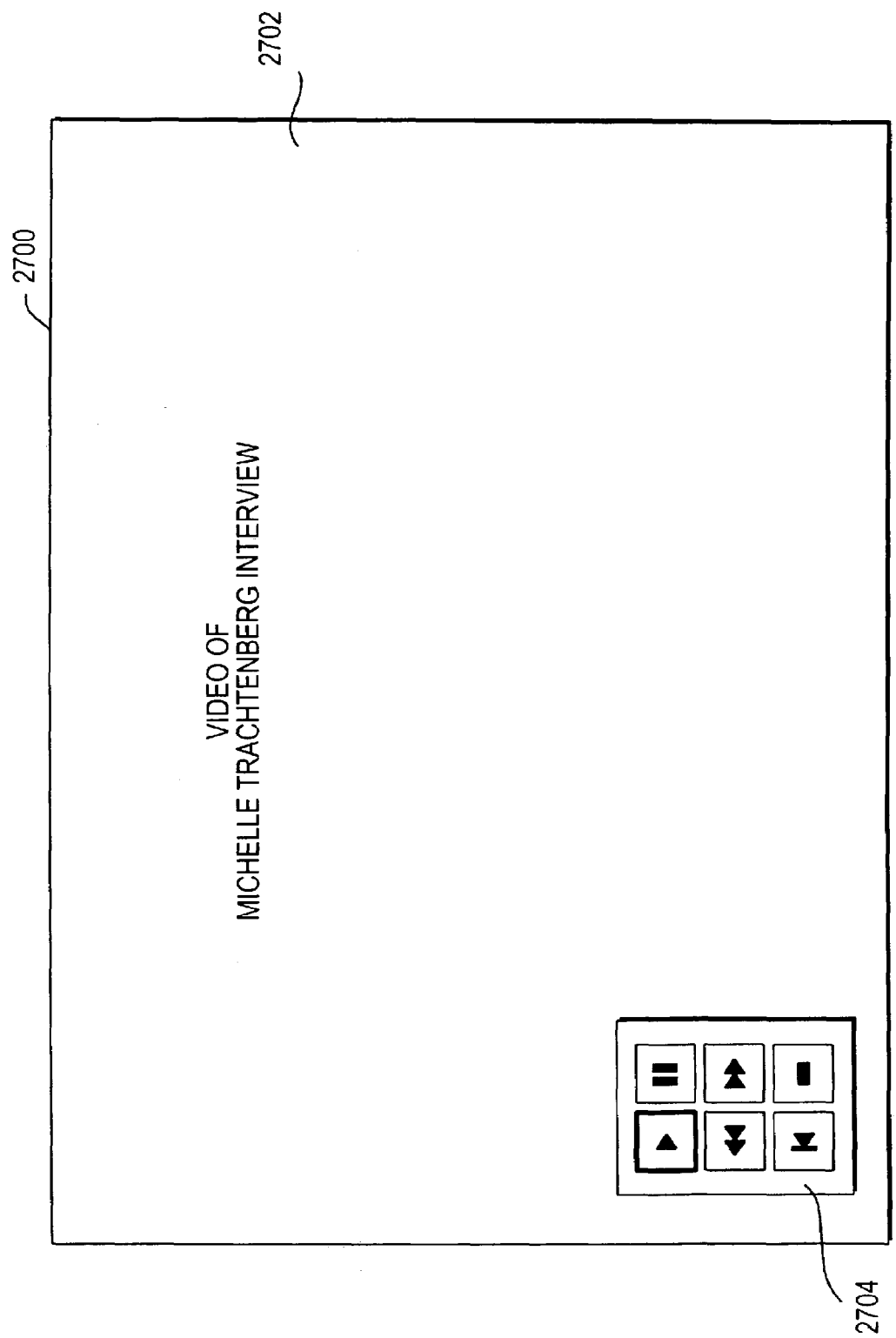
FIG. 27 is an illustrative display screen showing how video for a recording selected from the list of FIG. 26 may be displayed for the user in accordance with the present invention.

A recording for which the user selects to view may be displayed for the user on a display screen such as recording playback screen 2700 of FIG. 27. Recording playback screen 2700 may include the video 2702 of the selected program that is being played back to the user and options 2704 for controlling the video. Options 2704 may include, for example, options that allow the user to rewind the video to the beginning, to rewind or reverse the video, to play the video, to fast-forward the video, to pause the video, or to stop the video. Other video playback control options may be provided if desired. Control of these functions and other interactive television application functions may be supported using on-screen options, dedicated or multi-purpose keys on remote control 72 or other user devices, or other suitable arrangements involving user interface 18. When on-screen options are used, the options may be displayed in the form of one or more overlays on top of video 2702, or video 2702 may be provided in a reduced-size window and the options may be displayed outside of this window.

With the arrangement of FIGS. 26 and 27, the user can browse stored recordings and play back (and control the playback) of the stored recordings. Recordings that are stored locally on user equipment 18 may be played back by retrieving these recordings from the local hard drive or other storage on which the recordings are maintained. Recordings that are stored on the network may be played back from the network equipment on which the recorded content is stored. User equipment 18 may receive such content in the form of a real-time video stream or a file download and the interactive television application may play back the received content using a display screen arrangement of the type shown in FIG. 27.

Figure 28:
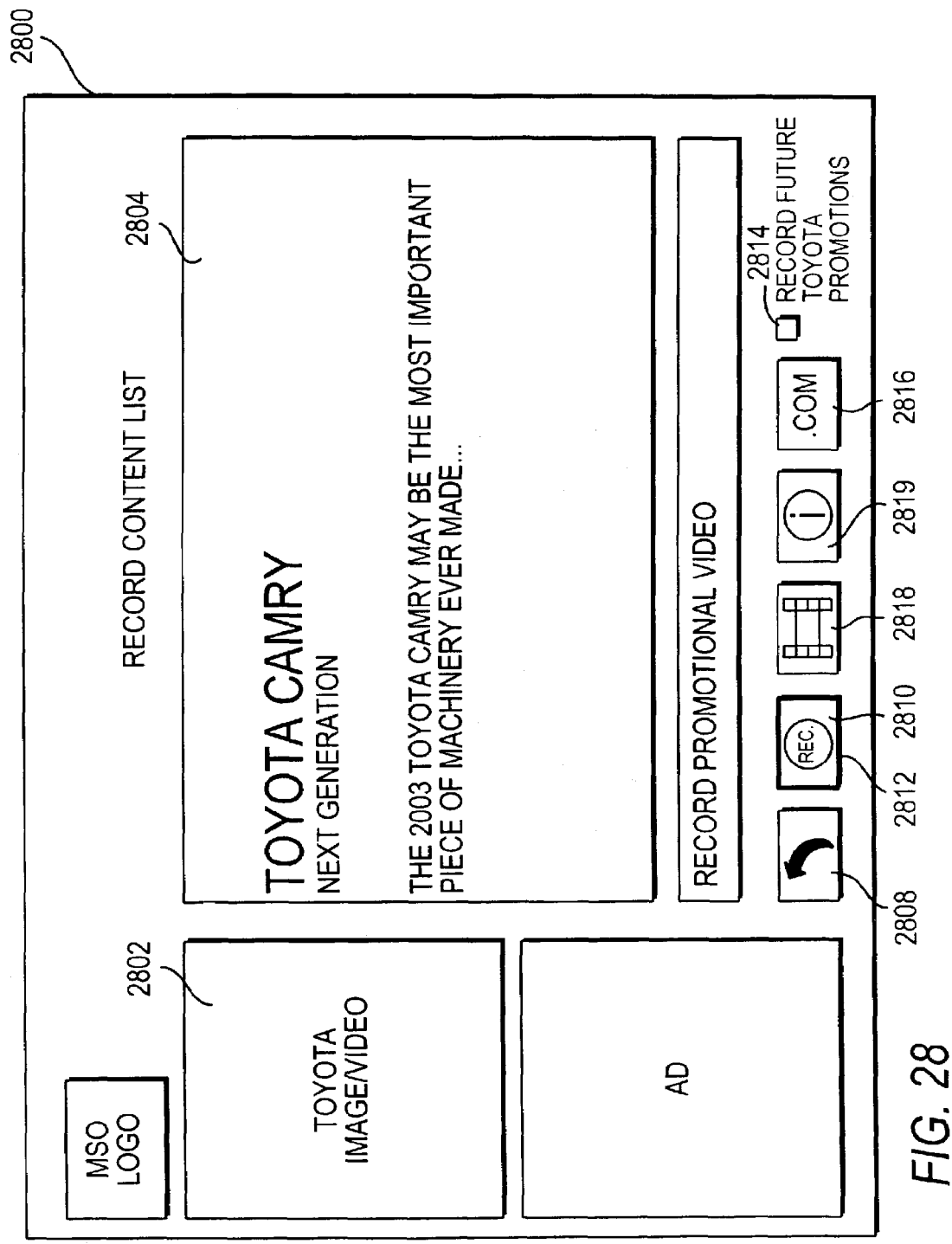
FIGS. 28 and 29 are illustrative display screens showing how the user may be provided with additional information about a selected advertisement and a selectable record option in accordance with the present invention.

The user may access program guide content associated with other selectable advertisements provided by program listings screen 2400 of FIG. 24. For example, from program listings screen 2400, the user may select Toyota Camry advertisement 2406 and be presented with Toyota advertisement content screen 2800 in FIG. 28. Toyota advertisement content screen 2800 may include summary caption 2804 which may be provided in any media format and may include, for example, text, images, video, audio, any other suitable media format, or a combination thereof. A graphic display 2802 depicting the selected advertised item may also be included in screen 2800.

The user may be provided with a variety of onscreen options for accessing various program guide features. For example, the user may select option 2808 to return to a previous screen (e.g., program listings screen 2400 of FIG. 24). Option 2818 may be selected to provide the user with an opportunity to view a video clip related to the selected advertisement (e.g., a promotional video clip for the selected advertisement). Option 2819 may be selected to access more information about the selected advertisement, and option 2816 may be selected to access a web site or web service related to the selected advertisement. Other on-screen options for accessing various interactive television applications may also be provided if desired.

The user may also be provided with an opportunity to record video related to the selected advertisement (e.g., a promotional video of the new Toyota Camry) by selecting record option 2810. The user may use cursor keys 82 of remote control 72 (FIG. 4) to position highlight region 2812 on record option 2810 (or any other selectable on-screen option) and may select to record the related video using OK key 84 of the remote control. Other techniques for selecting the record related video option 2810 may also be used. Upon selecting record promotional video option 2810, the interactive television application may record and store the video related to the selected advertisement (e.g., the promotional video) using the personal video recorder or network-based video recorder techniques previously discussed.

The user may indicate a desire to record future instances of video related to the selected advertisement as additional video becomes available that is related to the selected advertisement. In such cases, users may select an option, such as record future Toyota promotions option 2814, to instruct the interactive television application to record all available video-related to the selected advertisement.

Figure 29:
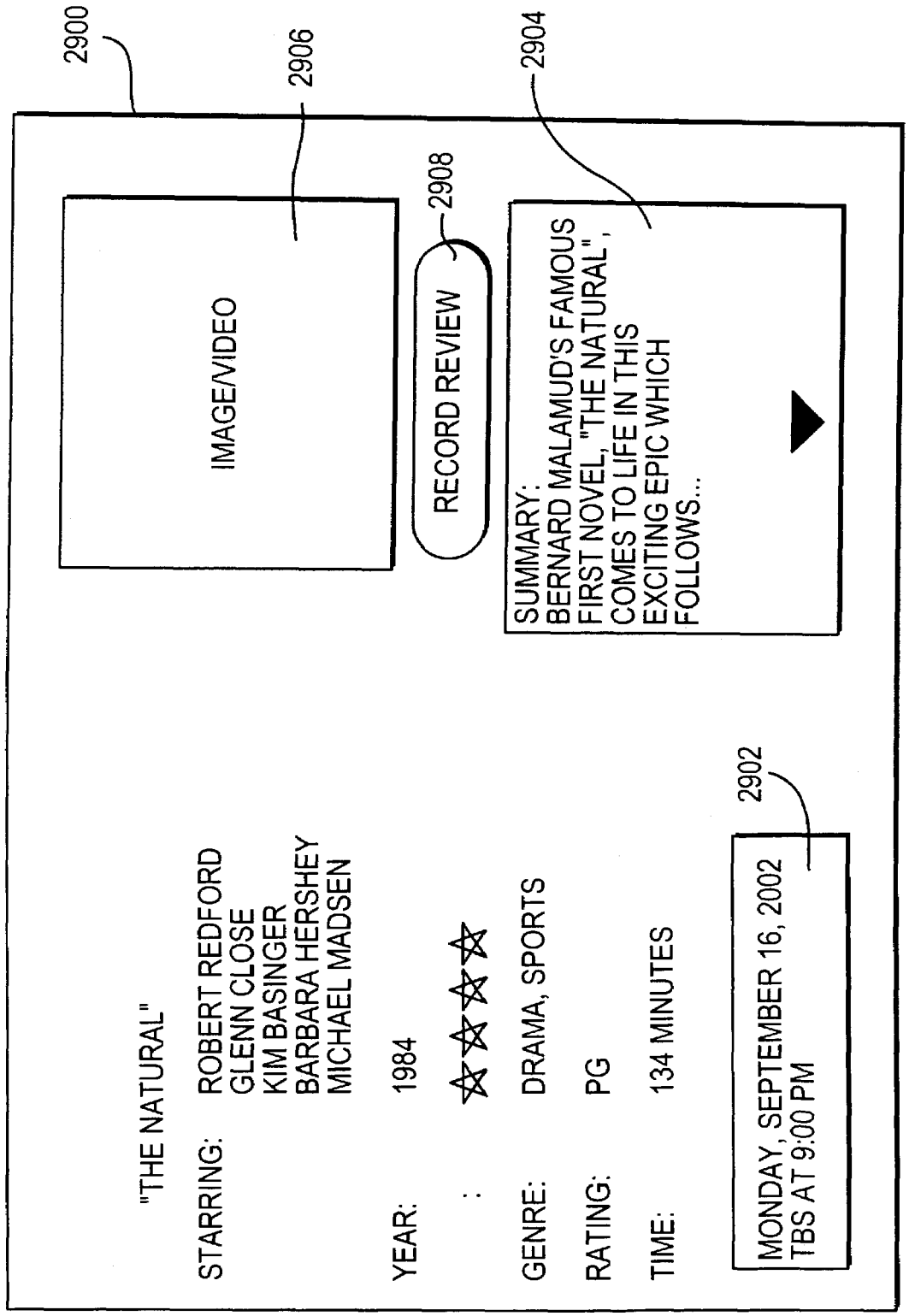

From program listings screen 2400, the user may select banner advertisement 2408. Upon selecting banner advertisement 2408, the user may be presented with advertising content screen 2900 of FIG. 29. Advertising content screen 2900 may be used to provide detailed information for any selected event, for example a sporting event, a serial television show, a video-on-demand or scheduled movie, a pay-per-view feature, or any other available television event. Advertising content screen 2900 may include detailed information about the television event, for example stars, year, rating, genre, run time, or any other suitable information for describing the event. Advertising content screen 2900 may also include scheduling information 2902 which may indicate the date, time and channel of the television event. Event advertisement summary 2904 may include a scrollable detailed description of the selected advertisement, while display 2906 may be provided to present the user with additional information about the selected advertisement (e.g., a photograph of the main character or cast, a trailer for the event, etc.).

Advertising content screen 2900 may also include record review option 2908 that the user may select to record video related to the selected advertisement. The example illustrated in screen 2900 of FIG. 29 indicates that a review of the selected event is available and may be recorded in response to the user selecting record review option 2908 (e.g., using a highlight region and remote control as previously discussed). Upon selecting record review option 2908, the interactive television application may record and store the video related to the selected advertisement (e.g., the movie review) using the personal video recorder or network-based video recorder techniques previously discussed. Additional video related to the selected event, such as trailers or other video-based information, may also be available and recorded by the interactive television application if so instructed by the user.

In another embodiment, the video content may be recorded automatically when the advertisement or other guide content is selected or displayed. For example, when the user selects advertisements 2404, 2406, 2408, information screens such as screens 2500, 2800, or 2900, may be displayed and the interactive television application may automatically schedule a time to record video related to the selected advertisement without requiring the user to select an on-screen option.

The user may desire to receive alert notifications that a video related to a selected display and previously selected for recording has been recorded to the user's local or remote recording device. The user may be provided with an option to set an alert to appear once selected video has been recorded and is available for viewing. Or, an alert may be generated automatically after the user selects video to record without requiring the user to select an option to do so. The interactive television application may display a pop-up alert overlay on top of a video that the user is watching.

Figure 30:
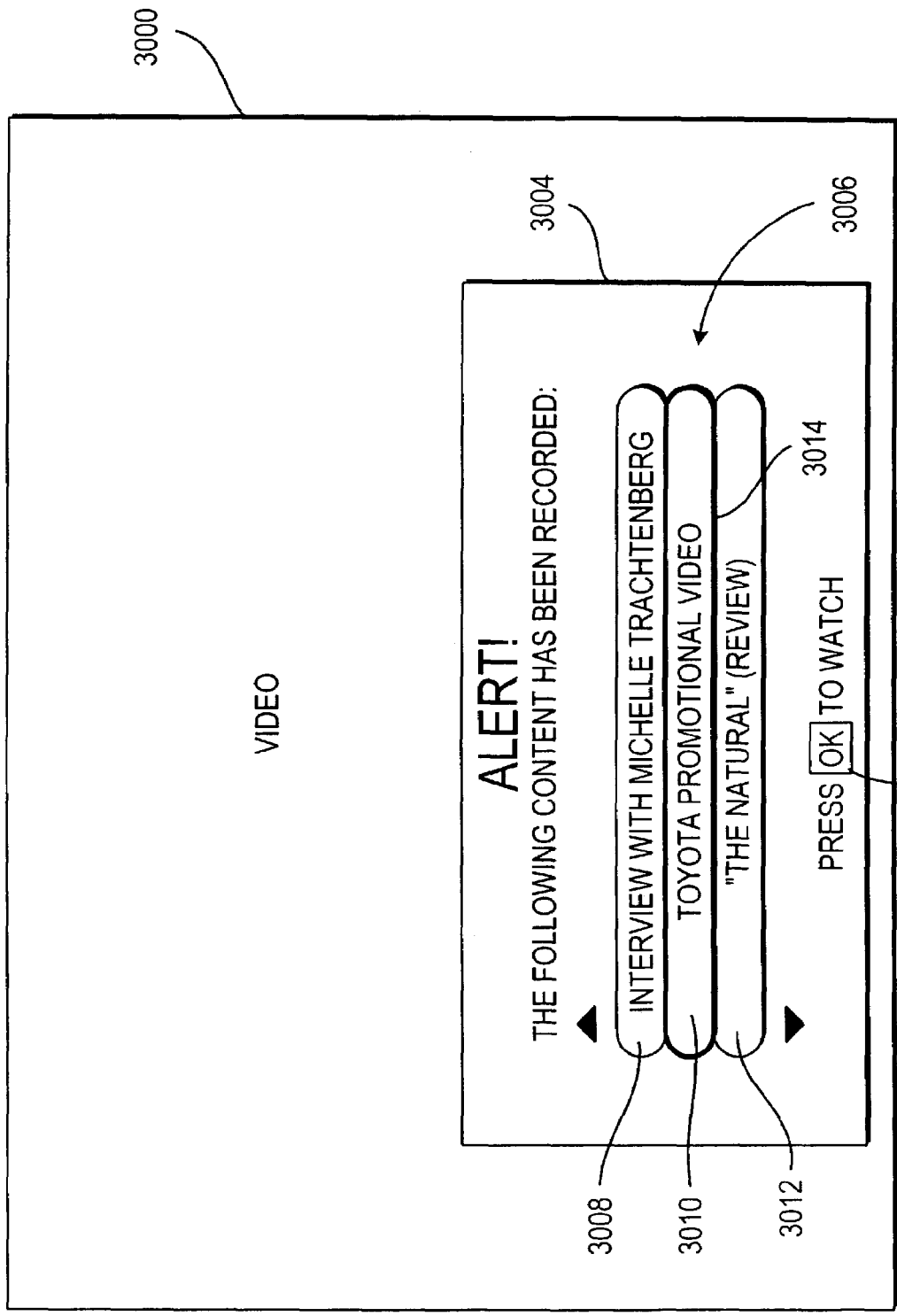
FIG. 30 is an illustrative display screen showing how an alert may be provided for a user in accordance with the present invention.

An illustrative alert is shown in FIG. 30. In the example of FIG. 30, the user is watching a video 3002. Previously, the user may have arranged for an alert to be provided by the interactive television application once a video selected for recording has been recorded. In FIG. 30, the pop-up alert overlay 3004 includes scrollable recorded video list 3006. Recorded video list 3006 may include listings for video recorded by the interactive television application, for example, the interview with Michelle Trachtenberg 3008 recorded in connection with FIG. 25, Toyota promotional video 3010 recorded in connection with FIG. 28, and "The Natural" review 3012 recorded in connection with FIG. 29. The recorded related video displayed in pop-up alert overlay may reside in a local or remote storage device and may be selected and viewed by the user.

The user can view a recorded video listing presented in the alert by selecting the listing. For example, the user may use cursor keys 82 of remote control 72 (FIG. 4) to position highlight region 3014 on a listing and may select the listing by pressing key 84 of the remote control. The interactive television application may then retrieve from the recording device the recorded video and present to the user the desired video.

The alert list may be displayed at any suitable time after the interactive television application has recorded the related video. For example, the alert may be displayed the first time the user interacts with the interactive television application after the recording is created. The alert list may be displayed around the periphery of a video being displayed and the video being displayed may be displayed in a reduced-size window. These are merely illustrative examples for providing alert 3004 and any suitable arrangement may be used to notify the user of the availability of recorded related video for which the user has arranged for alerts to occur.

A flow chart of illustrative steps involved in selecting a display for guide content, such as an advertisement, and recording video related to the selected display is shown in FIG. 31. At step 3102, the interactive television application may provide the user with on-screen selectable displays (e.g., selectable advertisements). For example, an interactive television program guide may be used to provide the user with an opportunity to select on-screen advertisements or promotions for products and services, news, interviews, events, television programs, weather forecasts, or any other suitable content.

After the user has used the interactive television application to select a display, the user may be provided with additional information related to the selected display at step 3104. The information may be presented in any media format, such as text, images, video, any other suitable media format, or a combination thereof. The information provided at step 3104 may also include an on-screen selectable record option, which the user may select to record video related to the selected display. Alternatively, the interactive television may automatically schedule related video to be recorded in response to the user selecting a display at step 3104. In such a scenario, the user need not select an on-screen option or otherwise indicate a desire to record related video.

When the user indicates a desire to record video related to a selected display by selecting the record option, the interactive television application may, at step 3106, record the related video. In a personal video recorder arrangement, the interactive television application may be used to record the related video locally on user equipment in response to the user commands. The interactive television application may record related video in conjunction with a network-based video recorder device and application or a local personal video recorder device and application if available. In a personal video recorder arrangement, the interactive television application may be used to record video locally on the user equipment in response to the user commands. In a network-based video recorder arrangement, the interactive television application may be used to record video or to make virtual recordings on network equipment such as server 36, 56, or equipment at service provider 50 in response to the user commands. The user commands may be provided to the network equipment over the communications paths shown in FIG. 1. The personal video recorder arrangement and the network-based video recorder arrangement can support functions such as fast-forward, rewind, pause, play, and record. A local or remote storage device may be used to store the recording.

The foregoing is merely illustrative of the principles of this invention and various modifications may be made by those skilled in the art without departing from the scope and spirit of the invention. Those skilled in the art will appreciate that the present invention may be practiced by other than the described embodiments, which are presented for purposes of illustration and not of limitation, and the present invention is limited only by the claims.

What is claimed is:

1. A method for using an interactive television program guide to allow a user to record a video related to an advertisement, comprising:
   using the interactive television program guide to display a screen of interactive television program guide content including at least one selectable advertisement; and
   in response to a single user selection of a selectable advertisement of the at least one selectable advertisement and without any further input from the user, both: (1) using the interactive television program guide to display a screen of additional information that is related to the selected advertisement; and (2) automatically scheduling a recording of a video related to the selected advertisement.

2. The method of claim 1 wherein automatically scheduling a recording of the video related to the selected advertisement comprises scheduling a recording of the video on a network-based personal video recorder.

3. The method of claim 1 wherein automatically scheduling a recording of the video related to the selected advertisement comprises scheduling a recording of the video on a personal video recorder at the user's location.

4. The method of claim 1 wherein the video related to the selected advertisement comprises a video broadcast over a television channel to a user in a home.

5. The method of claim 1 further comprising providing an alert to notify the user when the video related to the selected advertisement has been recorded.

6. The method of claim 1 further comprising providing the user with an opportunity to record at least one additional video related to the selected advertisement.

7. The method of claim 1 further comprising providing the user with an opportunity to access a list of recorded videos.

8. The method of claim 7 further comprising providing the user with an opportunity to select a video from the list of recorded videos for viewing.

9. The method of claim 8 further comprising allowing the user to control the playback of the selected video.

10. The method of claim 8 further comprising allowing the user to set parental controls for the playback of the selected video.

11. The method of claim 1 further comprising receiving user input to automatically schedule all available videos related to the selected advertisement for recording at a later time.

12. The method of claim 1 wherein automatically scheduling a recording of the video related to the selected advertisement comprises copying the video to a network location accessible by the user.

13. User equipment for use in an interactive television system in which television programming is delivered to a plurality of users over communications paths, the user equipment for each user comprising:
   control circuitry configured to:
      display a screen of interactive television program guide content including at least one selectable advertisement; and
      in response to a single user selection of a selectable advertisement of the at least one selectable advertisement and without any further input from the user, both: (1) display a screen of additional information that is related to the selected advertisement; and (2) automatically schedule a recording of a video related to the selected advertisement.

14. The system of claim 13 wherein the control circuitry is configured to schedule a recording of the video related to the selected advertisement on a network-based personal video recorder.

15. The system of claim 13 wherein the control circuitry is configured to schedule a recording of the video related to the selected advertisement on a personal video recorder at the user's location.

16. The system of claim 13 wherein the video related to the selected advertisement comprises a video broadcast over a television channel to a user in a home.

17. The system of claim 13 wherein the control circuitry is further configured to provide an alert to notify the user when the video related to the selected advertisement has been recorded.

18. The system of claim 13 wherein the control circuitry is further configured to provide the user with an opportunity to record at least one additional video related to the selected advertisement.

19. The system of claim 13 wherein the control circuitry is further configured to provide the user with an opportunity to access a list of recorded videos.

20. The system of claim 19 wherein the control circuitry is further configured to provide the user with an opportunity to select a video from the list of recorded videos for viewing.

21. The system of claim 20 wherein the control circuitry is further configured to allow the user to control the playback of the selected video.

22. The system of claim 20 wherein the control circuitry is further configured to provide the user with an opportunity to set parental controls for the playback of the selected video.

23. The system of claim 13 wherein the control circuitry is configured to automatically schedule all available videos related to the selected advertisement for recording at a later time.

24. The system of claim 13 wherein the control circuitry is configured to copy the video related to the selected advertisement to a network location accessible by the user.

25. A machine-readable medium for use in allowing a user of an interactive television program guide to record a video related to an advertisement, comprising machine program logic recorded thereon for:
displaying a screen of interactive television program guide content including at least one selectable advertisement; and
in response to a single user selection of a selectable advertisement of the at least one selectable advertisement and without any further input from the user, both:
(1) displaying a screen of additional information that is related to the selected advertisement; and (2) automatically scheduling a recording of a video related to the selected advertisement.

26. The machine-readable medium of claim 25 further comprising machine program logic for scheduling a recording of the video related to the selected advertisement on a network-based personal video recorder.

27. The machine-readable medium of claim 25 further comprising machine program logic for scheduling a recording of the video related to the selected advertisement on a personal video recorder at the user's location.

28. The machine-readable medium of claim 25 wherein the video related to the selected advertisement comprises a video broadcast over a television channel to a user in a home.

29. The machine-readable medium of claim 25 further comprising machine program logic for providing an alert to notify the user when the video related to the selected advertisement has been recorded.

30. The machine-readable medium of claim 25 further comprising machine program logic for providing the user with an opportunity to record at least one additional video related to the selected advertisement.

31. The machine-readable medium of claim 25 further comprising machine program logic for providing the user with an opportunity to access a list of recorded videos.

32. The machine-readable medium of claim 31 further comprising machine program logic for providing the user with an opportunity to select a video from the list of recorded videos for viewing.

33. The machine-readable medium of claim 32 further comprising machine program logic for allowing the user to control the playback of the selected video.

34. The machine-readable medium of claim 32 further comprising machine program logic for providing the user with an opportunity to set parental controls for the playback of the selected video.

35. The machine-readable medium of claim 25 further comprising machine program logic for automatically scheduling all available videos related to the selected advertisement for recording at a later time.

36. The-machine-readable medium of claim 25 further comprising machine program logic for copying the video related to the selected advertisement to a network location accessible by the user.

\* \* \* \* \*